US 9,426,165 B2

(12) United States Patent
Billa et al.

(10) Patent No.: US 9,426,165 B2
(45) Date of Patent: Aug. 23, 2016

(54) METHOD AND APPARATUS FOR COMPILATION OF FINITE AUTOMATA

(71) Applicant: Cavium, Inc., San Jose, CA (US)

(72) Inventors: Satyanarayana Lakshmipathi Billa, Sunnyvale, CA (US); Rajan Goyal, Saratoga, CA (US); Abhishek Dikshit, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 53 days.

(21) Appl. No.: 14/015,248

(22) Filed: Aug. 30, 2013

(65) Prior Publication Data

US 2015/0067776 A1 Mar. 5, 2015

(51) Int. Cl.
*H04L 29/06* (2006.01)

(52) U.S. Cl.
CPC ........ *H04L 63/1408* (2013.01); *H04L 63/0245* (2013.01)

(58) Field of Classification Search
CPC ..... H04L 63/10; H04L 63/14; H04L 63/1408; H04L 63/1416; H04L 63/1425; H04L 63/0245
See application file for complete search history.

(56) References Cited

U.S. PATENT DOCUMENTS

| 5,428,554 | A | 6/1995 | Laskoski |
| 5,608,662 | A | 3/1997 | Large et al. |
| 5,893,142 | A | 4/1999 | Moyer et al. |
| 6,314,513 | B1 | 11/2001 | Ross et al. |
| 7,046,848 | B1 | 5/2006 | Olcott |
| 7,225,188 | B1 | 5/2007 | Gai et al. |
| 7,260,558 | B1 * | 8/2007 | Cheng et al. ............ 706/12 |
| 7,460,473 | B1 | 12/2008 | Kodama et al. |
| 7,594,081 | B2 | 9/2009 | Bouchard et al. |
| 7,702,629 | B2 | 4/2010 | Cytron et al. |
| 7,710,988 | B1 * | 5/2010 | Tripathi et al. ............ 370/411 |
| 7,870,161 | B2 * | 1/2011 | Wang ............ 707/801 |

(Continued)

FOREIGN PATENT DOCUMENTS

| EP | 2276217 A2 | 1/2011 |
| WO | WO 2004/013777 A1 | 2/2004 |

(Continued)

OTHER PUBLICATIONS

Becchi, M., "Data Structures, Algorithms and Architectures for Efficient Regular Expression Evaluation," Washington University in St. Louis School of Engineering & Applied Science, published May 2009.

(Continued)

*Primary Examiner* — Joseph P Hirl
*Assistant Examiner* — J. Brant Murphy
(74) *Attorney, Agent, or Firm* — Hamilton, Brook, Smith & Reynolds, P.C.

(57) ABSTRACT

A method and corresponding apparatus are provided implementing run time processing using Deterministic Finite Automata (DFA) and Non-Deterministic Finite Automata (NFA) to find the existence of a pattern in a payload. A subpattern may be selected from each pattern in a set of one or more regular expression patterns based on at least one heuristic and a unified deterministic finite automata (DFA) may be generated using the subpatterns selected from all patterns in the set, and at least one non-deterministic finite automata (NFA) may be generated for at least one pattern in the set, optimizing run time performance of the run time processing.

73 Claims, 17 Drawing Sheets

(56) References Cited

U.S. PATENT DOCUMENTS

| | | | |
|---|---|---|---|
| 7,949,683 B2 | 5/2011 | Goyal | |
| 7,962,434 B2 | 6/2011 | Estan et al. | |
| 8,024,802 B1* | 9/2011 | Preston | 726/22 |
| 8,051,085 B1* | 11/2011 | Srinivasan et al. | 707/737 |
| 8,180,803 B2 | 5/2012 | Goyal | |
| 8,301,788 B2 | 10/2012 | Bouchard et al. | |
| 8,392,590 B2 | 3/2013 | Bouchard et al. | |
| 8,407,794 B2 | 3/2013 | Kim et al. | |
| 8,473,523 B2 | 6/2013 | Goyal | |
| 8,554,698 B2 | 10/2013 | Bando et al. | |
| 8,566,344 B2 | 10/2013 | Bando et al. | |
| 8,683,590 B2 | 3/2014 | Namjoshi et al. | |
| 9,083,731 B2 | 7/2015 | Namjoshi et al. | |
| 9,203,805 B2 | 12/2015 | Goyal et al. | |
| 2004/0059443 A1 | 3/2004 | Sharangpani | |
| 2004/0162826 A1 | 8/2004 | Wyschogrod et al. | |
| 2004/0172234 A1 | 9/2004 | Dapp et al. | |
| 2004/0225999 A1 | 11/2004 | Nuss | |
| 2005/0278781 A1* | 12/2005 | Zhao et al. | 726/22 |
| 2006/0069872 A1 | 3/2006 | Bouchard et al. | |
| 2006/0075206 A1 | 4/2006 | Bouchard et al. | |
| 2006/0085533 A1* | 4/2006 | Hussain et al. | 709/223 |
| 2006/0101195 A1 | 5/2006 | Jain | |
| 2007/0192863 A1 | 8/2007 | Kapoor et al. | |
| 2008/0034427 A1 | 2/2008 | Cadambi et al. | |
| 2008/0047012 A1 | 2/2008 | Rubin et al. | |
| 2008/0059464 A1* | 3/2008 | Law et al. | 707/6 |
| 2008/0071783 A1* | 3/2008 | Langmead et al. | 707/6 |
| 2008/0082946 A1 | 4/2008 | Zilic et al. | |
| 2008/0097959 A1* | 4/2008 | Chen et al. | 707/2 |
| 2008/0101371 A1* | 5/2008 | Law et al. | 370/392 |
| 2008/0189784 A1 | 8/2008 | Mangione-Smith et al. | |
| 2008/0229415 A1 | 9/2008 | Kapoor et al. | |
| 2008/0262991 A1 | 10/2008 | Kapoor et al. | |
| 2008/0270833 A1* | 10/2008 | McMillen | 714/32 |
| 2008/0271141 A1 | 10/2008 | Goldman et al. | |
| 2009/0106183 A1* | 4/2009 | Estan | H04L 69/22 706/48 |
| 2009/0119279 A1* | 5/2009 | Goyal et al. | 707/5 |
| 2009/0119399 A1* | 5/2009 | Hussain et al. | 709/224 |
| 2009/0138440 A1 | 5/2009 | Goyal | |
| 2009/0138494 A1 | 5/2009 | Goyal | |
| 2010/0095162 A1* | 4/2010 | Inakoshi | 714/45 |
| 2010/0114973 A1* | 5/2010 | Goyal | 707/802 |
| 2010/0138367 A1 | 6/2010 | Yamagaki | |
| 2010/0146623 A1* | 6/2010 | Namjoshi et al. | 726/23 |
| 2010/0153420 A1 | 6/2010 | Yang et al. | |
| 2010/0158394 A1 | 6/2010 | Chang et al. | |
| 2010/0174770 A1 | 7/2010 | Pandya | |
| 2010/0192225 A1* | 7/2010 | Ma et al. | 726/23 |
| 2010/0198850 A1 | 8/2010 | Cytron et al. | |
| 2011/0016154 A1* | 1/2011 | Goyal et al. | 707/798 |
| 2011/0093484 A1 | 4/2011 | Bando et al. | |
| 2011/0093496 A1 | 4/2011 | Bando et al. | |
| 2011/0113191 A1 | 5/2011 | Pandya | |
| 2011/0119440 A1 | 5/2011 | Pandya | |
| 2011/0173490 A1 | 7/2011 | Narayanaswamy et al. | |
| 2011/0185077 A1* | 7/2011 | Bremler-Barr et al. | 709/231 |
| 2011/0238855 A1 | 9/2011 | Korsunsky et al. | |
| 2011/0320397 A1 | 12/2011 | Podkolzin et al. | |
| 2012/0017262 A1 | 1/2012 | Kapoor et al. | |
| 2012/0143854 A1* | 6/2012 | Goyal et al. | 707/723 |
| 2012/0221494 A1 | 8/2012 | Pasetto et al. | |
| 2012/0221497 A1 | 8/2012 | Goyal et al. | |
| 2012/0311529 A1 | 12/2012 | Beveridge et al. | |
| 2013/0133064 A1 | 5/2013 | Goyal et al. | |
| 2013/0191916 A1* | 7/2013 | Yao et al. | 726/23 |
| 2013/0290356 A1 | 10/2013 | Yang et al. | |
| 2014/0101176 A1 | 4/2014 | Ruehle | |
| 2014/0173254 A1 | 6/2014 | Ruehle | |
| 2014/0214749 A1* | 7/2014 | Ruehle | 706/48 |
| 2015/0066927 A1 | 3/2015 | Goyal et al. | |
| 2015/0067123 A1 | 3/2015 | Goyal et al. | |
| 2015/0067200 A1 | 3/2015 | Goyal et al. | |
| 2015/0067836 A1 | 3/2015 | Billa et al. | |
| 2015/0067863 A1 | 3/2015 | Billa et al. | |
| 2015/0186786 A1 | 7/2015 | Goyal et al. | |
| 2015/0220454 A1 | 8/2015 | Goyal et al. | |
| 2015/0220845 A1 | 8/2015 | Goyal et al. | |
| 2015/0262009 A1 | 9/2015 | Szabo | |
| 2015/0293846 A1 | 10/2015 | Goyal et al. | |
| 2015/0295889 A1 | 10/2015 | Goyal et al. | |
| 2015/0295891 A1 | 10/2015 | Goyal et al. | |
| 2016/0021060 A1 | 1/2016 | Goyal et al. | |
| 2016/0021123 A1 | 1/2016 | Goyal et al. | |

FOREIGN PATENT DOCUMENTS

| | | |
|---|---|---|
| WO | WO 2007/109445 A1 | 9/2007 |
| WO | WO 2008/005772 A2 | 1/2008 |
| WO | WO 2013/078053 | 5/2013 |

OTHER PUBLICATIONS

Becchi, M., et al., "A Hybrid Finite Automation for Practical Deep Packet Inspection," published 2007.

Becchi, M., et al., "Extending Finite Automata to Efficiently Match Perl-compatible Regular Expressions", Proceedings of the 2008 CoNext Conference, Dec. 9-12, 2008.

Chodnicki, S., "An Introduction to Regular Expressions/Adventures with Open Source B1", available at http://type-exit.org/adventures-with-open-source-bi/2011/05/an-introduction-to-regular-expressions May 7, 2013 (29 pgs).

Hoperoft, J.E. and Ullman, J.D., "Introduction to Automata Theory, Languages, and Computation," *Addison-Wesley Publishing, Reading, Massachusetts* (1979). ISBN 0-201-02988-X. (See chapter 2.).

Rabin, M.O. and Scott, D., "Finite Automata and their Decision Problems," *IBM Journal of Research and Development*, 3(2): 114-125 (1959).

Singh, H., Regular Expressions, http://www.seeingwithe.org/topic7html.html (2002) downloaded May 7, 2013 (10 pgs).

Sipser, M., "Introduction to the Theory of Computation," *PWS, Boston* (1997). ISBN 0-534-94728-X. (See section 1.2: Nondeterminism, pp. 47-63.).

Sun, W., et al., "HFilter: Hybrid Finite Automation Based Stream Filtering for Deep and Recursive XML Data," School of Computer Science and Tech., published 2008.

Branch, J.W. et al., "Denial of Service Intrusion Detection Using Time Dependent Deterministic Finite Automata," *Proc. Research Conference, Troy, NY*, Oct. 2002.

Faro, S., et al., "Efficient Variants of the Backward-Oracle-Matching Algorithm," *Proceedings of Prague Stringology Conference*, 2008, pp. 146-160.

Navarro, G., "NR-grep: A Fast and Flexible Pattern Matching Tool," pp. 1-49, published 2000.

Navarro, G., "Pattern Matching," pp. 1-24, published 2002.

U.S. Office Action dated Jun. 8, 2015 for U.S. Appl. No. 14/015,929, filed Aug. 30, 2013, entitled: "Method and Apparatus for Processing Finite Automata,"

U.S. Office Notice of Allowance dated Jan. 6, 2016 for U.S. Appl. No. 14/015,929, filed Aug. 30, 2013, entitled "Method and Apparatus for Processing Finite Automata,"

* cited by examiner

NFA for .*a[^\n]
Graph size of 4 nodes

NFA for .*a[^\n][^\n]
Graph size of 5 nodes

NFA for .*a[^\n][^\n][^\n]
Graph size of 6 nodes

DFA for the pattern: ".*a[^/n]"
Graph size of 4 nodes

Note: return arrows from each
state if '/n' is seen are not shown.

| PATTERN | NUMBER OF NFA-NODES | NUMBER OF DFA-NODES |
|---|---|---|
| .*a[^\n] | 4 | 4 |
| .*a[^\n][^\n] | 5 | 8 |
| .*a[^\n][^\n][^\n] | 6 | 16 |
| .*a[^\n][^\n][^\n][^\n] | 7 | 32 |
| .*a[^\n][^\n][^\n][^\n][^\n] | 8 | 64 |
| • | • | • |
| • | • | • |
| • | • | • |
| .*a[^\n]$_1$...[^\n]$_n$ | $n+3$ | $2^n$ |

FIG. 2G

METHOD AND APPARATUS FOR COMPILATION OF FINITE AUTOMATA

BACKGROUND OF THE INVENTION

The Open Systems Interconnection (OSI) Reference Model defines seven network protocol layers (L1-L7) used to communicate over a transmission medium. The upper layers (L4-L7) represent end-to-end communications and the lower layers (L1-L3) represent local communications.

Networking application aware systems need to process, filter and switch a range of L3 to L7 network protocol layers, for example, L7 network protocol layers such as, HyperText Transfer Protocol (HTTP) and Simple Mail Transfer Protocol (SMTP), and L4 network protocol layers such as Transmission Control Protocol (TCP). In addition to processing the network protocol layers, the networking application aware systems need to simultaneously secure these protocols with access and content based security through L4-L7 network protocol layers including Firewall, Virtual Private Network (VPN), Secure Sockets Layer (SSL), Intrusion Detection System (IDS), Internet Protocol Security (IPSec), Anti-Virus (AV) and Anti-Spam functionality at wire-speed.

Network processors are available for high-throughput L2 and L3 network protocol processing, that is, performing packet processing to forward packets at wire-speed. Typically, a general purpose processor is used to process L4-L7 network protocols that require more intelligent processing. Although a general purpose processor can perform the compute intensive tasks, it does not provide sufficient performance to process the data so that it can be forwarded at wire-speed.

Content aware networking requires inspection of the contents of packets at "wire speed." The content may be analyzed to determine whether there has been a security breach or an intrusion. A large number of patterns and rules in the form of regular expressions are applied to ensure that all security breaches or intrusions are detected. A regular expression is a compact method for describing a pattern in a string of characters. The simplest pattern matched by a regular expression is a single character or string of characters, for example, /c/ or /cat/. The regular expression also includes operators and meta-characters that have a special meaning.

Through the use of meta-characters, the regular expression can be used for more complicated searches such as, "abc.*xyz". That is, find the string "abc", followed by the string "xyz", with an unlimited number of characters in-between "abc" and "xyz". Another example is the regular expression "abc..abc.*xyz;" that is, find the string "abc," followed two characters later by the string "abc" and an unlimited number of characters later by the string "xyz."

An Intrusion Detection System (IDS) application inspects the contents of all individual packets flowing through a network, and identifies suspicious patterns that may indicate an attempt to break into or compromise a system. One example of a suspicious pattern may be a particular text string in a packet followed 100 characters later by another particular text string.

Content searching is typically performed using a search method such as, Deterministic Finite Automata (DFA) or Non-Deterministic Finite Automata (NFA) to process the regular expression.

SUMMARY OF THE INVENTION

Embodiments of the present invention provide a method, apparatus, computer program product, and corresponding system for compilation and run time processing of finite automata.

According to one embodiment, a method may, in at least one processor operatively coupled to at least one memory in a security appliance operatively coupled to a network, select a subpattern from each pattern in a set of one or more regular expression patterns based on at least one heuristic. The method may generate a unified deterministic finite automata (DFA) using the subpatterns selected from all patterns in the set. The method may generate at least one non-deterministic finite automata (NFA) for at least one pattern in the set. A portion of the at least one pattern used for generating the at least one NFA, and at least one walk direction for run time processing of the at least one NFA, may be determined based on whether a length of the subpattern selected is fixed or variable and a location of the subpattern selected within the at least one pattern. The method may store the unified DFA and the at least one NFA generated in the at least one memory.

The at least one heuristic may include maximizing a number of unique subpatterns selected and length of each subpattern selected.

The method may determine whether the length of the subpattern selected is fixed or variable.

The method may compute a hash value of each subpattern selected and store each hash value computed in association with an identifier of a pattern from which the subpattern was selected.

The at least one heuristic may include maximizing a number of unique subpatterns selected. The method may include, for each pattern in the set, computing a hash value of the subpattern selected. The method may compare the hash value computed to a list of hash values of subpatterns selected for other patterns in the set. If the hash value computed is found in the list, the method may determine whether to replace (i) the subpattern selected with another subpattern from the pattern or (ii) the subpattern selected for another pattern in the set with an alternate subpattern selected from the other pattern in the set. The other pattern in the set may be identified based on an association with the hash value computed in the list. The determination for whether to replace (i) or (ii) may be based on comparing lengths of subpatterns being considered for the replacement in order to maximize lengths of the unique subpatterns being selected.

The at least one heuristic may include identifying subpatterns of each pattern and disregarding a given subpattern of the subpatterns identified of each pattern, if the given subpattern has a length less than a minimum threshold.

The at least one heuristic may include accessing a knowledge base of subpatterns associated with historical frequency of use indicators and disregarding a given subpattern of the subpatterns identified of each pattern, if a historical frequency of use indicator for the given subpattern in the knowledge base accessed is greater than or equal to a frequency use threshold.

The at least one heuristic may include identifying subpatterns of each pattern and for each pattern, maximizing a number of consecutive text characters in the subpattern selected by selecting a given subpattern of the subpatterns identified based on the given subpattern having a largest number of consecutive text characters of the subpatterns identified and based on the given subpattern being unique among all subpatterns selected for the set of one or more regular expressions.

The at least one heuristic may include prioritizing given subpatterns of each pattern based on a subpattern type of each of the given subpatterns and lengths of the given subpatterns, a longer length subpattern being prioritized higher than another subpattern of lesser length, selecting a unique subpattern as the subpattern selected, based on the prioritizing, the unique subpattern selected having a length of at least a minimum length threshold, and selecting a non-unique subpattern as the subpattern selected, based on the prioritizing, if none of the given subpatterns are unique and have a length of at least the minimum length threshold.

The at least one heuristic may include prioritizing given subpatterns of each pattern based on a subpattern type of each of the given subpatterns, the subpattern type being text only, alternation, single character repetition, or multi-character repetition, and a priority order from highest to lowest for the subpattern type is text only, alternation, single character repetition, and multi-character repetition.

If a first element of the subpattern selected is a first element of the at least one pattern and the length of the subpattern selected is fixed, the location of the subpattern selected may be a beginning-location of the at least one pattern, the portion of the at least one pattern used for generating the at least one NFA may be the at least one pattern excluding the subpattern selected. The at least one NFA may be a single NFA, and the at least one walk direction of the at least one NFA may be a forward walk direction.

Generating the unified DFA may include associating a DFA node, of the unified DFA generated, that is associated with the last element of the subpattern selected, with metadata indicating to a walker, configured to walk the unified DFA and the at least one NFA generated with a payload, a pointer to a starting node of the at least one NFA generated, an instruction to transition to walk the at least one NFA in a forward walk direction, and to report a match of the subpattern selected, a lead offset within the payload, of a lead character matching the last element of the subpattern selected at the DFA node, as an end offset of the subpattern selected, and a length of the subpattern selected. The starting node of the at least one NFA may be associated with a first element of the portion of the at least one pattern used for generating the at least one NFA, a payload starting offset of the at least one NFA being associated with a byte subsequent to another byte at the end offset of the subpattern selected.

Generating the at least one NFA may include associating an NFA node, of the at least one NFA generated, with metadata indicating to the walker an instruction to terminate the walk, the NFA node associated with a last element of the at least one pattern, and to report a lag offset within the payload, of a lag character matching at the NFA node, as an end offset of the at least one pattern and a final match of the at least one pattern.

If a first element of the subpattern selected is not a first element of the at least one pattern and a last element of the subpattern selected is not a last element of the at least one pattern, the location of the subpattern selected may be a mid-location of the at least one pattern. If the length of the subpattern selected is fixed the portion of the at least one pattern for generating the at least one NFA may include a lag portion and a lead portion of the at least one pattern. The lag portion of the at least one pattern may be the at least one pattern excluding the subpattern selected and the lead portion of the at least one pattern. The lead portion of the at least one pattern may exclude the subpattern selected and the lag portion of the at least one pattern. The at least one NFA may include a lag NFA and a lead NFA, the at least one walk direction may include a forward walk direction and a reverse walk direction, the lag NFA may have the forward walk direction and the lead NFA may have the reverse walk direction. The lag portion of the at least one pattern may be used for generating the lag NFA and the lead portion of the at least one pattern may be used for generating the lead NFA.

Generating the unified DFA may include associating a DFA node of the unified DFA generated, the DFA node associated with the last element of the subpattern selected, with metadata indicating to a walker, configured to walk the unified DFA and the at least one NFA generated with a payload, a pointer to a starting node of the lag NFA, an instruction to transition to walk the lag NFA in the forward walk direction, the starting node of the lag NFA associated with a first element of the lag portion, the payload starting offset of the lag NFA associated with byte subsequent to the end offset of the subpattern selected, a pointer to a starting node of the lead NFA, an instruction to transition to walk the lead NFA in the reverse walk direction, the starting node of the lead NFA associated with a last element of the lead portion, a payload starting offset of the lead NFA determined by subtracting the length of subpattern selected from the end offset of the subpattern selected, and to report an offset within the payload, of a character matching the last element of the subpattern selected at the DFA node, as an end offset of the subpattern selected, a match of the subpattern selected, and a length of the subpattern selected.

Generating the at least one NFA may include associating a lag node of the lag NFA, the lag node associated with the last element of the at least one pattern, with metadata indicating to a walker, configured to walk the unified DFA and the at least one NFA generated with a payload, an instruction to terminate walking the lag NFA generated, and to report a lag offset within the payload, of a lag character of the payload matching the last element at the lag node, and a match of the lag portion of the at least one pattern. Generating the at least one NFA may include associating a lead node of the lead NFA, the lead node associated with the first element of the at least one pattern, with metadata indicating to the walker, an instruction to terminate walking the lead NFA generated and to report a match of the lead portion of the at least one pattern and a lead offset within the payload, of a lead character of the payload matching the first element at the lead node, as a start offset of the at least one pattern, if required by a qualifier associated with the at least one pattern.

If a first element of the subpattern selected is not a first element of the at least one pattern, and a last element of the subpattern selected may not be a last element of the at least one pattern, the location of the subpattern selected may be a mid-location of the at least one pattern, and if the first element of the subpattern selected is the first element of the at least one pattern, the location of the subpattern selected may be the beginning-location of the at least one pattern. If the length of the subpattern is fixed or variable the portion of the at least one pattern for generating the at least one NFA may include a lag portion and an entire portion of the at least one pattern. The lag portion of the at least one pattern may be the at least one pattern excluding a lead portion of the at least one pattern. The lead portion may include the first element of the at least one pattern, the last element of the subpattern selected, and all elements in the at least one pattern therebetween. The entire portion of the at least one pattern may be the at least one pattern, the lead portion being the subpattern selected if the location of the subpattern selected is a beginning-location. The at least one NFA may include a lag NFA and an umbrella NFA. The at least one walk direction may include a forward walk direction and a reverse walk direction. The lag NFA may have the forward walk direction and the umbrella NFA may have the reverse walk direction. The lag portion of the at least one pattern may be used for generating the lag NFA and the entire portion of the at least one pattern may be used for generating the umbrella NFA.

Generating the unified DFA may include associating a DFA node of the unified DFA generated, the DFA node associated with the last element of the subpattern selected, with metadata indicating to a walker, configured to walk the unified DFA and the at least one NFA generated with a payload, a pointer to a starting node of the lag NFA, an instruction to transition to walk the lag NFA in the forward walk direction, the starting node of the lag NFA associated with a first element of the lag portion, and to report a match of the subpattern selected and an offset within the payload, of a character matching the last element of the subpattern selected at the DFA node, as an end offset of the subpattern selected, and a length of the subpattern selected if the length is fixed.

Generating the at least one NFA may include associating a lag node of the lag NFA generated, the lag node associated with the last element of the at least one pattern, with metadata indicating to a walker, configured to walk the unified DFA and the at least one NFA generated with a payload, a pointer to a starting node of the umbrella NFA, an instruction to transition to walk the umbrella NFA in the reverse walk direction, the starting node of the umbrella NFA associated with the last element of the at least one pattern, and to optionally report an offset within the payload, of a character matching the last element of the at least one pattern at the lag node, and to optionally report a match of the lag portion of the at least one pattern. Generating the at least one NFA may include associating an umbrella node of the umbrella NFA generated, the umbrella node associated with the first element of the at least one pattern, with metadata indicating to the walker, an instruction to terminate the walk and to report a final match of the at least one pattern and a start offset within the payload, of a start character matching the first element of the at least one pattern at the umbrella node, as a start offset of the at least one pattern, if required by a qualifier associated with the at least one pattern.

If a first element of the subpattern selected is not a first element of the at least one pattern, and a last element of the subpattern selected is not a last element of the at least one pattern, the location of the subpattern selected may be a mid-location of the at least one pattern, and if the first element of the subpattern selected is the first element of the at least one pattern, the location of the subpattern selected may be a beginning-location of the at least one pattern. If the length of the subpattern is fixed or variable the portion of the at least one pattern for generating the at least one NFA may include a lag portion and a lead portion of the at least one pattern. The lag portion of the at least one pattern may be the at least one pattern excluding the lead portion of the at least one pattern. The lead portion may include the first element of the at least one pattern, the last element of the subpattern selected, and all elements in the at least one pattern therebetween. The lag portion may be the subpattern selected if the location of the subpattern selected is the beginning-location. The at least one NFA may include a lag NFA and a lead NFA. The at least one walk direction may include a forward walk direction and a reverse walk direction. The lag NFA may have the forward walk direction and the lead NFA may have the reverse walk direction. The lag portion of the at least one pattern may be used for generating the lag NFA. The lead portion of the at least one pattern may be used for generating the lead NFA.

Generating the unified DFA may include associating a DFA node of the unified DFA generated, the DFA node associated with the last element of the subpattern selected, with metadata indicating to a walker, configured to walk the unified DFA and the at least one NFA generated with a payload, a pointer to a starting node of the lag NFA, an instruction to transition to walk the lag NFA in the forward walk direction, the starting node of the lag NFA associated with a first element of the lag portion, a pointer to a starting node of the lead NFA, an instruction to transition to walk the lead NFA in the reverse walk direction, the starting node of the lead NFA associated with a last element of the subpattern selected, and to report a match of the subpattern selected and an offset within the payload, of a character matching the last element of the subpattern selected at the DFA node, as an end offset of the subpattern selected, and a length of the subpattern selected if the length is fixed.

Generating the at least one NFA may include associating a lag node of the lag NFA generated, the lag node associated with the last element of the at least one pattern, with metadata indicating to a walker, configured to walk the unified DFA and the at least one NFA generated with a payload, an instruction to terminate walking the lag NFA, and to report a lag offset within the payload, of a lag character matching the last element of the at least one pattern at the lag node, and to report a match of the lag portion of the at least one pattern. Generating the at least one NFA may include associating a lead node of the lead NFA generated, the lead node associated with the first element of the at least one pattern, with metadata indicating to the walker, an instruction to terminate walking the lead NFA and to report a match of the lead portion and a lead offset within the payload, of a lead character matching the first element of the at least one pattern at the lead node.

If a first element of the subpattern selected is not a first element of the at least one pattern, and a last element of the subpattern selected is not a last element of the at least one pattern, the location of the subpattern selected may be a mid-location of the at least one pattern. If the length of the subpattern selected is fixed or variable the at least one NFA may be a single NFA. The at least one walk direction may include a forward walk direction, for run time processing nodes of the single NFA associated with elements of a lag portion of the at least one pattern, and a reverse walk direction, for run time processing nodes of the single NFA associated with all elements of the at least one pattern. The lag portion of the at least one pattern may be the at least one pattern excluding a lead portion of the at least one pattern, the lead portion may include the first element of the at least one pattern, the last element of the subpattern selected, and all elements in the at least one pattern therebetween.

Generating the unified DFA may include associating a DFA node of the unified DFA generated, the node associated with the last element of the subpattern selected, with metadata indicating to a walker, configured to walk the unified DFA and the at least one NFA generated with a payload, a pointer to a starting node of the single NFA, an instruction to transition to walk the single NFA generated in the forward walk direction, the starting node associated with a next element in the at least one pattern immediately following the last element of the subpattern selected, and to report a match of the subpattern selected, an offset within the payload, of a character matching the last element of the subpattern selected at the DFA node, as an end offset of the subpattern selected, and a length of the subpattern selected if the length is fixed.

Generating the at least one NFA may include associating a lag node of the single NFA, the lag node associated with a last element of the at least one pattern, with metadata indicating to a walker, configured to walk the unified DFA and the at least one NFA generated with a payload, an instruction to transition to walk the single NFA in the reverse walk direction with a payload starting offset associated with the end offset of the subpattern selected. Generating the at least one NFA may include associating a lead node of the single NFA, the lead node associated with the first element of the at least one pattern, with metadata indicating to the walker, an instruction to terminate the walk, and to report an offset within the payload, of a character matching the first element of the at least one pattern at the lead node, as a start offset of the at least one pattern, if required by a qualifier associated with the at least one pattern, and a final match of the at least one pattern.

If a first element of the subpattern selected is not a first element of the at least one pattern, and a last element of the subpattern selected is not a last element of the at least one pattern, the location of the subpattern selected may be a mid-location of the at least one pattern. If the length of the subpattern selected is fixed the at least one NFA may be a single NFA. The at least one walk direction may include a reverse walk direction, for run time processing nodes of the single NFA associated with a lead portion of the at least one pattern, and a forward walk direction, for run time processing nodes of the single NFA associated with all elements of the at least one pattern. The lead portion may be the at least one pattern excluding a lag portion of the at least one pattern. The lag portion may include the first element of the subpattern selected, the last element of the at least one pattern, and all elements in the at least one pattern therebetween.

Generating the unified DFA may include associating a DFA node of the unified DFA generated, the node associated with the last element of the subpattern selected, with metadata indicating to a walker, configured to walk the unified DFA and the at least one NFA generated with a payload, a pointer to a starting node of the single NFA, an instruction to transition to walk the single NFA generated in the reverse walk direction, the starting node associated with a last element of the lead portion, a payload starting offset being determined by subtracting the length of subpattern selected from the end offset of the subpattern selected, and to report a match of the subpattern selected, an offset within the payload, of a character matching the last element of the subpattern selected at the DFA node, as an end offset of the subpattern selected, and a length of the subpattern selected.

Generating the at least one NFA may include associating a lead node of the single NFA, the lead node associated with a first element of the at least one pattern, with metadata indicating to a walker, configured to walk the unified DFA and the at least one NFA generated with a payload, an instruction to transition to walk the single NFA in the forward walk direction. Generating the at least one NFA may include associating a lag node of the single NFA, the lag node associated with the last element of the at least one pattern, with metadata indicating to the walker, an instruction to terminate the walk, and to report an offset within the payload, of a character matching the last element of the at least one pattern at the lag node, and a final match of the at least one pattern.

If a last element of the subpattern selected is a last element of the at least one pattern, the location of the subpattern selected may be an end-location of the at least one pattern, and if the length of the subpattern selected is fixed, the portion of the at least one pattern for generating the at least one NFA may be the at least one pattern excluding the subpattern selected, and the at least one walk direction may be a reverse walk direction.

Generating the unified DFA may include associating a DFA node, the DFA node corresponding to the last element of the subpattern selected, with metadata indicating to a walker, configured to walk the unified DFA and the at least one NFA generated with a payload, a pointer to a starting node of the at least one NFA generated, an instruction to transition to walk the at least one NFA generated in a reverse walk direction, the starting node of the at least one NFA generated associated with a last element of the portion, a payload starting offset of the at least one NFA generated determined by subtracting the length of subpattern selected from the end offset of the subpattern selected, and to report a match of the subpattern selected and an offset within the payload, of a character matching the last element of the subpattern selected at the DFA node, as an end offset of the subpattern selected.

Generating the at least one NFA may include associating an NFA node associated with a first element of the portion, with metadata indicating to a walker, configured to walk the unified DFA and the at least one NFA generated with a payload, to terminate the walk and to report a final match of the at least one pattern and an offset within the payload, of a character matching the first element of the portion at the NFA node, as a start offset of the at least one pattern, if required by a qualifier associated with the at least one pattern.

If a last element of the subpattern selected is a last element of the at least one pattern, the location of the subpattern selected may be an end-location of the at least one pattern, and if the length of the subpattern selected is variable or fixed, the portion of the at least one pattern for generating the at least one NFA may be the at least one pattern, and the at least one walk direction may be a reverse walk direction.

Generating the unified DFA may include associating a DFA node, the DFA node corresponding to the last element of the subpattern selected, with metadata indicating to a walker, configured to walk the unified DFA and the at least one NFA generated with a payload, a pointer to a starting node of the at least one NFA generated, an instruction to transition to walk the at least one NFA generated in a reverse walk direction, the starting node of the at least one NFA generated associated with a last element of the subpattern selected, a payload starting offset of the at least one NFA generated being associated with the end offset of the subpattern selected, and to report a match of the subpattern selected and an offset within the payload, of a character matching the last element of the subpattern selected at the DFA node, as an end offset of the subpattern selected, and a length of the subpattern selected if the length is fixed.

Generating the at least one NFA may include associating an NFA node associated with a first element of the portion, with metadata indicating to a walker, configured to walk the unified DFA and the at least one NFA generated with a payload, to terminate the walk and to report a final match of the at least one pattern and an offset within the payload, of a character matching the first element of the portion at the NFA node, as a start offset of the at least one pattern, if required by a qualifier associated with the at least one pattern.

Storing the unified DFA and the at least one NFA generated in the at least one memory may include generating a binary image including the unified DFA and the at least one NFA generated.

The at least one processor may include a DFA co-processor and an NFA co-processor configured as an acceleration unit to offload DFA and NFA run time processing, respectively.

Another example embodiment disclosed herein includes an apparatus corresponding to operations consistent with the apparatus embodiments disclosed herein.

Further, yet another example embodiment may include a non-transitory computer-readable medium having stored thereon a sequence of instructions which, when loaded and executed by a processor, causes a processor to perform methods disclosed herein.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 2A-G are example NFA and DFA graphs and a table illustrating the concept of graph explosion.

DETAILED DESCRIPTION OF THE INVENTION

Before describing example embodiments of the present invention in detail, an example security application in which the embodiments may be implemented and typical processing using deterministic finite automata (DFA) and non-deterministic finite automata (NFA) are described immediately below to help the reader understand the inventive features of the present invention.

Figure 1:
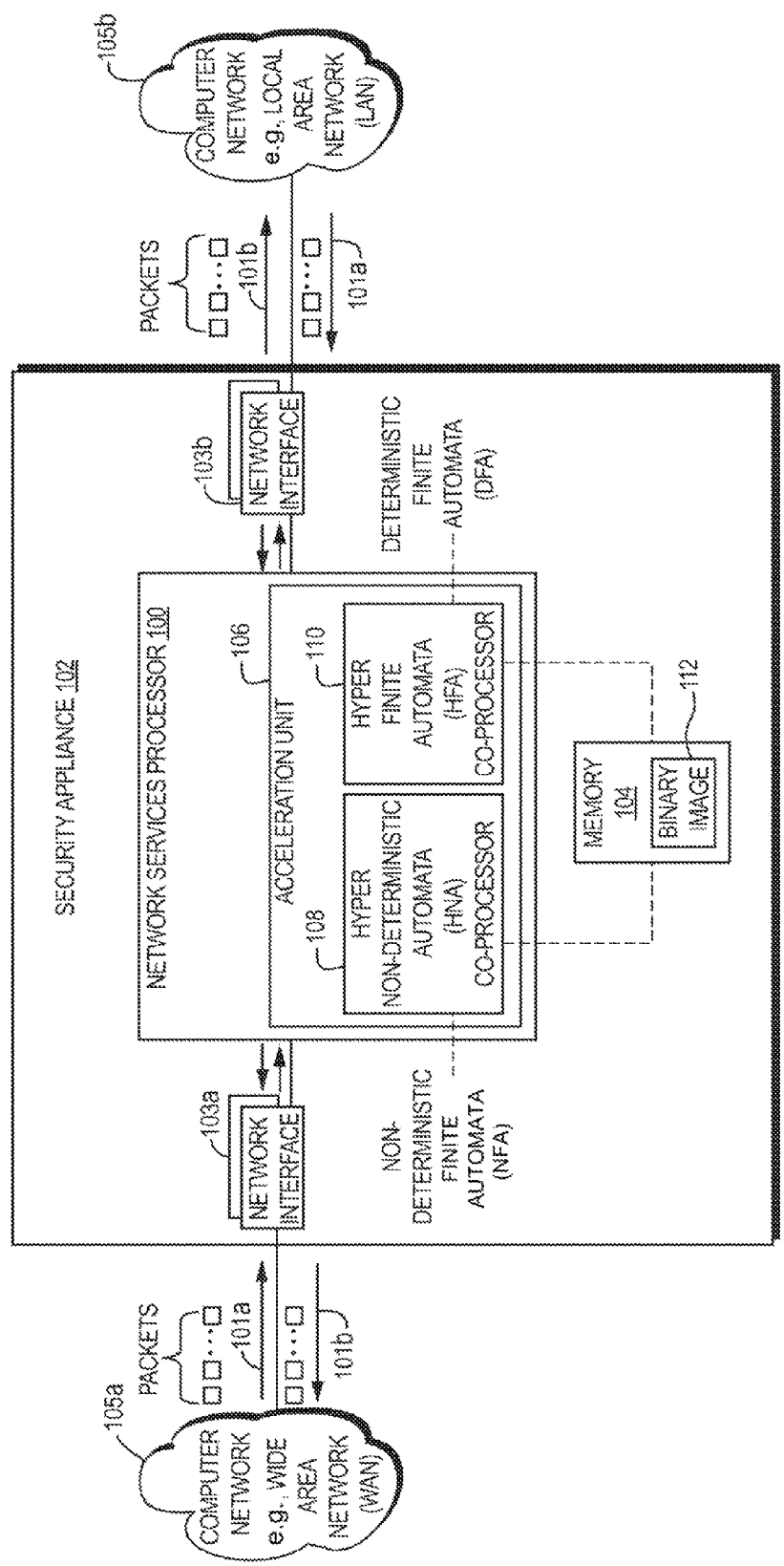
FIG. 1 is a block diagram of an embodiment of a security appliance in which embodiments disclosed herein may be implemented.

FIG. 1 is a block diagram of an embodiment of a security appliance 102 in which embodiments of the present invention may be implemented. The security appliance 102 may include a network services processor 100. The security appliance 102 may be a standalone system that may switch packets received at one network interface 103a to another network interface 103b and may perform a plurality of security functions on received packets prior to forwarding the packets. For example, the security appliance 102 may be used to perform security processing on packets 101a that may be received on a Wide Area Network (WAN) 105a, or any other suitable network, prior to forwarding the processed packets 101b to a Local Area Network (LAN) 105b, or any other suitable network.

The network services processor 100 may be configured to process Open System Interconnection (OSI) network L2-L7 layer protocols encapsulated in received packets. As is well-known to those skilled in the art, the OSI reference model defines seven network protocol layers (L1-L7). The physical layer (L1) represents the actual interface, electrical and physical that connects a device to a transmission medium. The data link layer (L2) performs data framing. The network layer (L3) formats the data into packets. The transport layer (L4) handles end to end transport. The session layer (L5) manages communications between devices, for example, whether communication is half-duplex or full-duplex. The presentation layer (L6) manages data formatting and presentation, for example, syntax, control codes, special graphics and character sets. The application layer (L7) permits communications between users, for example, file transfer and electronic mail.

The network services processor 100 may schedule and queue work (e.g., packet processing operations) for upper level network protocols, for example L4-L7, and enable processing of upper level network protocols in received packets to be performed to forward packets at wire-speed (i.e., a rate of data transfer of a network over which data may be transmitted and received). By processing the protocols to forward the packets at wire-speed, the network services processor 100 does not slow down the network data transfer rate. The network services processor 100 may receive packets from the network interfaces 103a or 103b that may be physical hardware interfaces, and perform L2-L7 network protocol processing on the received packets. The network services processor 100 may subsequently forward processed packets 101b through the network interfaces 103a or 103b to another hop in the network, a final destination, or through another bus (not shown) for further processing by a host processor (not shown). The network protocol processing may include processing of network security protocols such as Firewall, Application Firewall, Virtual Private Network (VPN) including IP Security (IPSec) and/or Secure Sockets Layer (SSL), Intrusion Detection System (IDS) and Anti-virus (AV).

The network services processor 100 may deliver high application performance using a plurality of processors (i.e. cores). Each of the cores (not shown) may be dedicated to performing data plane or control plane operations. A data plane operation may include packet operations for forwarding packets. A control plane operation may include processing of portions of complex higher level protocols such as Internet Protocol Security (IPSec), Transmission Control Protocol (TCP) and Secure Sockets Layer (SSL). A data plane operation may include processing of other portions of these complex higher level protocols.

The network services processor 100 may also include application specific co-processors (not shown) that offload the cores so that the network services processor 100 achieves high-throughput. For example, the network services processor 100 may include an acceleration unit 106 that may include a hyper non-deterministic finite automata (HNA) co-processor 108 for hardware acceleration of NFA processing and a hyper finite automata (HFA) co-processor 110 for hardware acceleration of DFA processing. The HNA 108 and HFA 110 co-processors may be configured to offload the network services processor 100 general purpose cores (not shown) from the heavy burden of performing compute and memory intensive pattern matching methods.

The network services processor 100 may perform pattern search, regular expression processing, content validation, transformation and security accelerate packet processing. The regular expression processing and pattern search may be used to perform string matching for AV and IDS applications and other applications that require string matching. A memory controller (not shown) in the network services processor 100 may control access to a memory 104 that is operatively coupled to the network services processor 100. The memory may be internal (i.e. on-chip) or external (i.e. off chip), or a combination thereof, and may be configured to store data packets received, such as packets 101a for processing by the network services processor 100. The memory may be configured to store compiled rules data utilized for lookup and pattern matching in DFA and NFA graph execution searches. The compiled rules data may be stored as a binary image 112 that includes compiled rules data for both DFA and NFA, or as multiple binary images separating DFA compiled rules data from NFA compiled rules data.

Typical content aware application processing may use either a DFA or an NFA to recognize patterns in content of received packets. DFA and NFA are both finite state machines, that is, models of computation each including a set of states, a start-state, an input alphabet (set of all possible symbols) and a transition function. Computation begins in the start-state and changes to new states dependent on the transition function.

The pattern is commonly expressed using a regular expression that includes atomic elements, for example, normal text characters such as, A-Z, 0-9 and meta-characters such as, *, ^ and |. The atomic elements of a regular expression are the symbols (single characters) to be matched. Atomic elements may be combined with meta-characters that allow concatenation (+) alternation (|), and Kleene-star (*). The meta-character for concatenation may be used to create multiple character matching patterns from a single character (or substrings) while the meta-character for alternation (|) may be used to create a regular expression that can match any of two or more sub-strings. The meta-character Kleene-star (*) allows a pattern to match any number of times, including no occurrences of the preceding character or string of characters.

Combining different operators and single characters allows complex subpatterns of expressions to be constructed. For example, a subpattern such as (th(is|at)*) may match multiple character strings, such as: th, this, that, thisis, thisat, thatis, or thatat. Another example of a complex subpattern of an expression may be one that incorporates a character class construct [ . . . ] that allows listing of a list of characters for which to search. For example, gr[ea]y looks for both grey and gray. Other complex subpattern examples are those that may use a dash to indicate a range of characters, for example, [A-Z], or a meta-character "." that matches any one character. An element of the pattern may be an atomic element or a combination of one or more atomic elements in combination with one or more meta-characters.

The input to the DFA or NFA state machine is typically a string of (8-bit) bytes, that is, the alphabet may be a single byte (one character or symbol), from an input stream (i.e. received packets). Each byte in the input stream may result in a transition from one state to another state. The states and the transition functions of the DFA or NFA state machine may be represented by a graph. Each node in the graph may represent a state and arcs in the graph may represent state transitions. A current state of the state machine may be represented by a node identifier that selects a particular node in the graph.

Using DFA to process a regular expression and to find a pattern or patterns described by a regular expression in an input stream of characters may be characterized as having deterministic run time performance. A next state of a DFA may be determined from an input character (or symbol), and a current state of the DFA, because there is only one state transition per DFA state. As such, run time performance of the DFA is said to be deterministic and the behavior can be completely predicted from the input. However, a tradeoff for determinism is a graph in which the number of nodes (or graph size) may grow exponentially with the size of a pattern.

In contrast, the number of nodes (or graph size) of an NFA graph may be characterized as growing linearly with the size of the pattern. However, using NFA to process the regular expression, and to find a pattern or patterns described by the regular expression in the input stream of characters, may be characterized as having non-deterministic run time performance. For example, given an input character (or symbol) and a current state of the NFA, it is possible that there is more than one next state of the NFA to which to transition. As such, a next state of the NFA cannot be uniquely determined from the input and the current state of the NFA. Thus, run time performance of the NFA is said to be non-deterministic as the behavior cannot be completely predicted from the input.

Figure 2A:
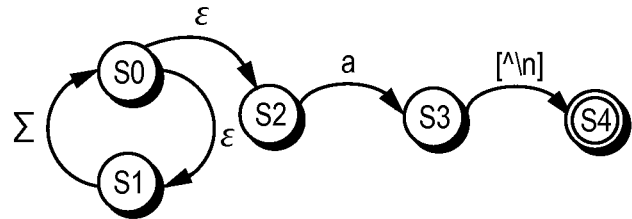
Figure 2B:
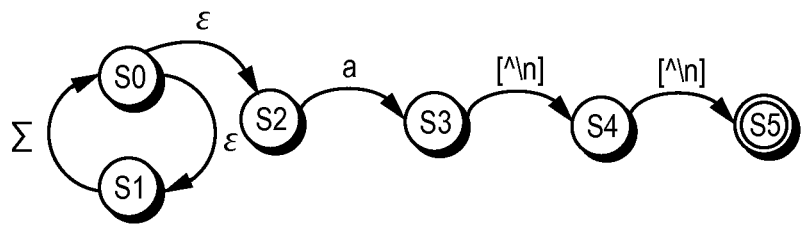
Figure 2C:
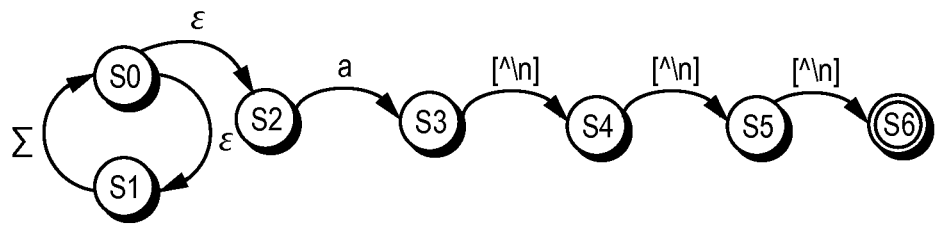
Figure 2D:
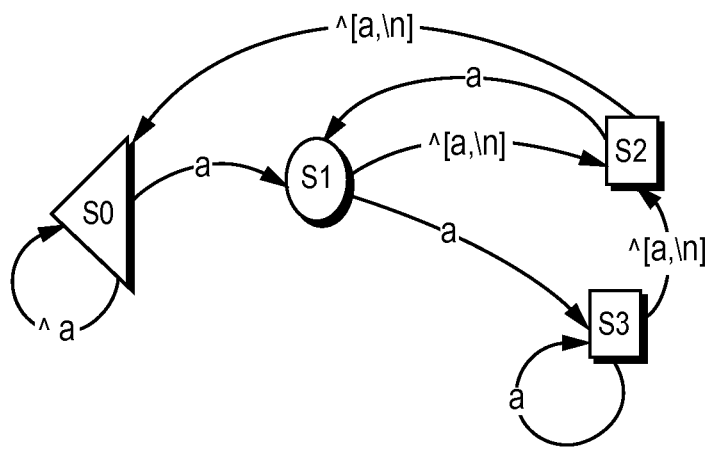
Figure 2E:
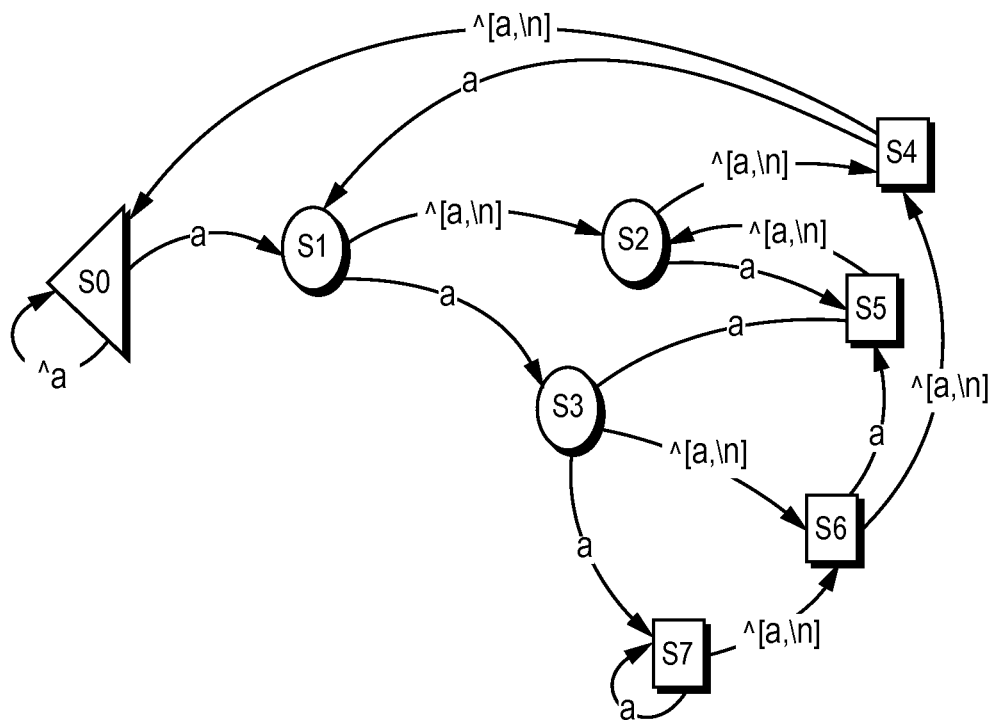
Figure 2F:
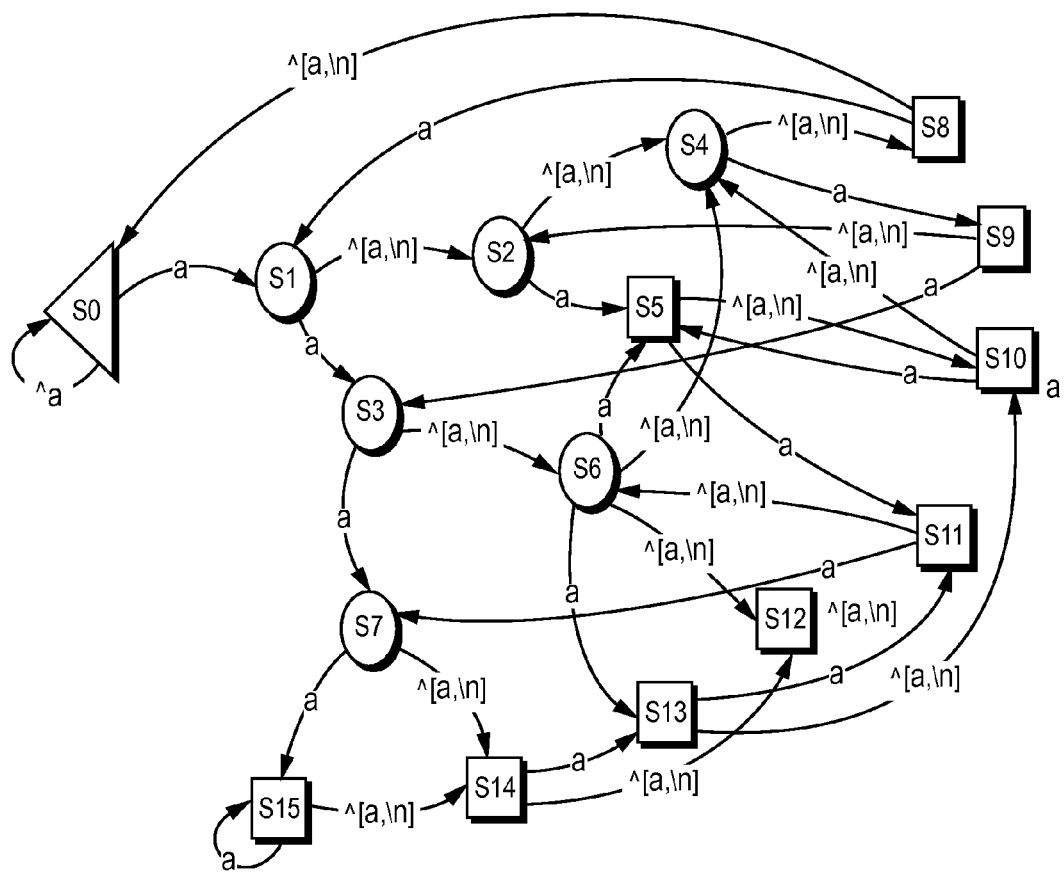

FIGS. 2A-G show the concept of DFA "graph explosion." FIGS. 2A, 2B, and 2C show NFA graphs for patterns ".*a[^\n]," ".*a[^\n] [^\n]," ".*a[^\n] [^\n] [^\n]," respectively, and FIGS. 2D, 2E, and 2F show DFA graphs for the same patterns, respectively. As shown in FIGS. 2A-2F, and summarized by the table of FIG. 2G, NFA may grow linearly for some patterns while DFA for the same patterns may grow exponentially resulting in a graph explosion. As shown, for a given pattern or patterns, a number of DFA states may be larger than a number of NFA states, typically on the order of several hundred more or a thousand more states. This is an example of "graph explosion," which is a hallmark characteristic of DFA.

According to embodiments disclosed herein, content searching may be performed using DFA, NFA, or a combination thereof. According to one embodiment, a run time processor, co-processor, or a combination thereof, may be implemented in hardware and may be configured to implement a compiler and a walker.

The compiler may compile a pattern or an input list of patterns (also known as signatures or rules) into the DFA, NFA, or combination thereof. The DFA and NFA may be binary data structures, such as DFA and NFA graphs and tables.

The walker may perform run time processing, i.e. actions for identifying an existence of a pattern in an input stream, or matching the pattern to content in the input stream. Content may be a payload portion of an Internet Protocol (IP) datagram, or any other suitable payload in an input stream. Run time processing of DFA or NFA graphs may be referred to as walking the DFA or NFA graphs, with the payload, to determine a pattern match. A processor configured to generate DFA, NFA, or a combination thereof, may be referred as a compiler herein. A processor configured to implement run time processing of a payload using the generated DFA, NFA, or combination thereof, may be referred to herein as a walker. According to embodiments disclosed herein, the network services processor 100 may be configured to implement a compiler and a walker in the security appliance 102.

Figure 3A:
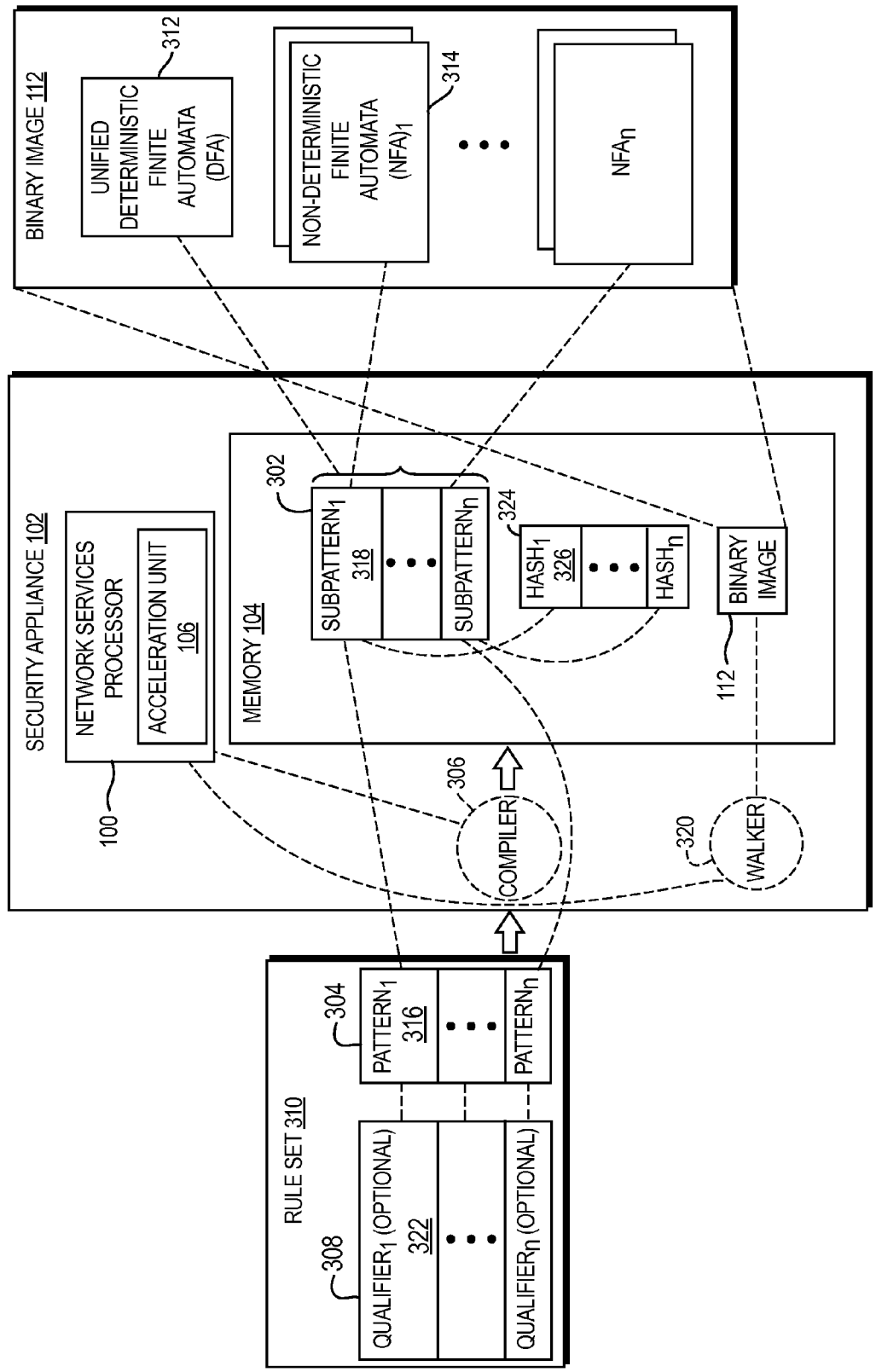
FIG. 3A is another block diagram of an embodiment of a security appliance in which embodiments disclosed herein may be implemented.

FIG. 3A is a block diagram of another embodiment of the security appliance 102 of FIG. 1 in which embodiments of the present invention may be implemented. As described in reference to FIG. 1, the security appliance 102 may be operatively coupled to one or more networks and may comprise the memory 104 and the network services processor 100 that may include the acceleration unit 106. In reference to FIG. 3A, the network services processor 100 may be configured to implement a compiler 306 that generates the binary image 112 and a walker 320 that uses the binary image 112. For example, the compiler 306 may generate the binary image 112 that includes compiled rules data used by the walker 320 for performing pattern matching methods on received packets 101a (shown in FIG. 1). According to embodiments disclosed herein, the compiler 306 may generate the binary image 112 by determining compiled rules data for DFA, NFA, or a combination thereof, based on at least one heuristic as described further below. The compiler 306 may determine rules data advantageously suited for DFA and NFA.

According to embodiments disclosed herein, the compiler 306 may generate the binary image 112 by processing a rule set 310 that may include a set of one or more regular expression patterns 304 and optional qualifiers 308. From the rule set 310, the compiler 306 may generate a unified DFA 312 using subpatterns selected from all of the one or more regular expression patterns and at least one NFA 314 for at least one pattern in the set of one or more regular expression patterns 304 for use by the walker 320 during run time processing, and metadata (not shown) including mapping information for transitioning the walker 320 between states (not shown) of the unified DFA 312 and states of the at least one NFA 314. The unified DFA 312 and the at least one NFA 314 may be represented data structure-wise as graphs, or in any other suitable form, and the mapping in the metadata may be represented data structure-wise as one or more tables, or in any other suitable form. According to embodiments disclosed herein, if a subpattern selected from a pattern is the pattern, no NFA is generated for the pattern. According to embodiments disclosed herein, each NFA that is generated may be for a particular pattern in the set, whereas a unified DFA may be generated based on all subpatterns from all patterns in the set.

The walker 320 walks the unified DFA 312 and the at least one NFA 314 with a payload by transitioning states of the unified DFA 312 and the at least one NFA based on consuming bytes from the payload in the received packets 101a. As such, the walker 320 walks the payload through the unified DFA 312 and the at least one NFA 314.

The rule set 310 may include a set of one or more regular expression patterns 304 and may be in a form of a Perl Compatible Regular Expression (PCRE) script file or any other suitable form. PCRE has become a de facto standard for regular expression syntax in security and networking applications. As more applications requiring deep packet inspections have emerged or more threats have become prevalent in the Internet, corresponding signatures/patterns to identify virus/attacks or applications have also become more complex. For example, signature databases have evolved from having simple string patterns to regular expression (regex) patterns with wild card characters, ranges, character classes, and advanced PCRE signatures.

As shown in FIG. 3A, the optional qualifiers 308 may each be associated with a pattern in the set of regular expression patterns 304. For example, optional qualifiers 322 may be associated with pattern 316. The optional qualifiers 308 may each be one or more qualifiers designating desired custom, advanced PCRE signature options, or other suitable options for processing the pattern associated with the qualifiers. For example, the qualifiers 322 may indicate whether or not a start offset (i.e., a position in a payload of a first matching character of a pattern that matches in the payload) option of the advanced PCRE signature options for the pattern 316 is desired.

With emerging applications, the start offset has become important to processing in Deep Packet Inspection (DPI) systems. Traditionally, finite automata only needed to report the existence or non-existence of a given pattern within an input and report the end offset of the matched pattern in the payload for processing. As described below, with reference to FIGS. 4-11, if the qualifier 322 indicates that the start offset is desired, the compiler 306 may generate the binary image 112 in a manner enabling the walker 320 to report (i.e. declare) an offset of the position in the payload of the first matching character of the pattern that matches in the payload.

According to embodiments disclosed herein, the compiler 306 may generate a unified DFA 312 using subpatterns 302 selected from all patterns in the set of one or more regular expression patterns 304. The compiler 306 may select subpatterns 302 from each pattern in the set of one or more regular expression patterns 304 based on at least one heuristic, as described further below. The compiler 306 may also generate at least one NFA 314 for at least one pattern 316 in the set, a portion (not shown) of the at least one pattern 316 used for generating the at least one NFA 314, and at least one walk direction for run time processing (i.e. walking) of the at least one NFA 314, may be determined based on whether a length of the subpattern selected 318 is fixed or variable and a location of the subpattern selected 318 within the at least one pattern 316. The compiler 306 may store the unified DFA 312 and the at least one NFA 314 in the at least one memory 104.

The compiler may determine whether length of the potential subpatterns selected is fixed or variable. For example, length of a subpattern such as "cdef" may be determined to have a fixed length of 4 as "cdef" is a string, whereas complex subpatterns including operators may be determined as having a variable length. For example, a complex subpattern such as "a.*cd[^\n]{0,10}.*y" may have "cd[^\n]{0,10}" as the subpattern selected, that may have a variable length of 2 to 12.

According to embodiments disclosed herein, subpattern selection may be based on at least one heuristic. A subpattern is a set of one or more consecutive elements from a pattern, wherein each element from the pattern may be represented by a node in a DFA or NFA graph, for purposes of matching bytes or characters from the payload. An element, as described above, may be a single text character represented by a node or a character class represented by a node. The compiler 306 may determine which subpatterns in the pattern are better suited for NFA based on whether or not a subpattern is likely to cause excessive DFA graph explosion, as described above in reference to FIGS. 2A-G. For example, generating a DFA from a subpattern including consecutive text characters would not result in DFA graph explosion, whereas complex subpatterns, as described above, may include operators as well as characters and, thus, may cause DFA graph explosion. For example, a subpattern including a wild card character or a larger character class repeated multiple times (e.g., [^\n]* or [^\n]{16}) may cause excessive states in a DFA and, thus, may be more advantageously suited for NFA.

As disclosed above, selecting a subpattern from each pattern in the set of one or more regular expressions 304 may be based on at least one heuristic. According to one embodiment, the at least one heuristic may include maximizing a number of unique subpatterns selected and length of each subpattern selected. For example, a pattern such as "ab.*cdef.*mn" may have multiple potential subpatterns, such as "ab.*," "cdef," and ".*mn". The compiler may select "cdef" as the subpattern for the pattern because it is a largest subpattern in the pattern "ab.*cdef.*mn" that is unlikely to cause DFA graph explosion. However, the compiler may select an alternate subpattern for the pattern "ab.*cdef.*mn" if the subpattern "cdef" has already been selected for another pattern. Alternatively, the compiler may replace the subpattern "cdef" with another subpattern for the other pattern, enabling the subpattern "cdef" to be selected for the pattern "ab.*cdef*mn."

As such, the compiler 306 may select subpatterns for the patterns in the set of one or more regular expressions 304 based on a context of possible subpatterns for each of the patterns in the set of one or more regular expressions 304, enabling maximization of the number of unique subpatterns selected and length of each subpattern selected. As such, the compiler 306 may generate a unified DFA 312 from the subpatterns selected 302 that minimizes a number of false positives (i.e., no match or partial match) in pattern matching of the at least one NFA 314 by increasing the probability of a pattern match in the at least one NFA 314.

By maximizing subpattern length, false positives in NFA processing may be avoided. False positives in NFA processing may result in non-deterministic run time processing and, thus, may reduce run time performance. Further, by maximizing a number of unique subpatterns selected, the compiler 306 enables a 1:1 transition between the unified DFA to the at least one NFA 314 generated from a pattern in the set given a match of a subpattern (from the pattern) in the unified DFA.

For example, if the subpattern selected was shared by multiple patterns, then a walker of the unified DFA would need to transition to multiple at least one NFAs because each at least one NFA is a per-pattern NFA, and the subpattern match from the unified DFA signifies a partial match for each of the multiple patterns. As such, maximizing the number of unique subpatterns reduces a number of DFA:NFA 1:N transitions, reducing run time processing by the walker 320.

To enable maximizing the number of unique subpatterns, the compiler 306 may compute a hash value 326 of the subpattern selected 318 and store the hash value computed 326 in association with an identifier (not shown) of a pattern 316 from which the subpattern 318 was selected. For example, the compiler 306 may, for each pattern in the set of one or more regular expressions 304, compute a hash value of the subpattern selected. The hash values computed 324 may be stored in the at least one memory 104 as a table, or in any suitable manner. The hash method used may be any suitable hash method. The compiler may compare the hash value computed to a list of hash values of subpatterns selected for other patterns in the set, in order to determine whether or not the subpattern selected is unique.

If the hash value computed is found in the list, the compiler may determine whether to replace (i) the subpattern selected with another subpattern from the pattern or (ii) the subpattern selected for another pattern in the set with an alternate subpattern selected from the other pattern in the set. The other pattern in the set may be identified based on an association with the hash value computed in the list. The determination for whether to replace (i) or (ii) may be based on comparing lengths of subpatterns being considered for the replacement in order to maximize lengths of the unique subpatterns being selected, as described above. Replacing a subpattern selected may include selecting a next longest subpattern identified for a given pattern, or a next highest prioritized subpattern. For example, potential subpatterns may be prioritized based on likely of resulting in DFA explosion or a magnitude of the DFA explosion expected.

According to embodiments disclosed herein, the at least one heuristic may include identifying subpatterns of each pattern and disregarding a given subpattern of the subpatterns identified of each pattern, if the given subpattern has a length less than a minimum threshold. For example, to reduce false positives in the at least one NFA, the compiler may disregard subpatterns with lengths less than the minimum threshold because such subpatterns may result in higher probability of a false positive in the at least one NFA.

The at least one heuristic may include accessing a knowledge base (not shown) of subpatterns associated with historical frequency of use indicators and disregarding a given subpattern of the subpatterns identified of each pattern, if a historical frequency of use indicator for the given subpattern in the knowledge base accessed is greater than or equal to a frequency use threshold. For example, application or protocol specific subpatterns may have a high frequency of use, such as for HyperText Transfer Protocol (HTTP) payloads, "carriage return line feed", or clear traffic such as multiple consecutive 0s from binary files, or any other frequently used subpattern.

The at least one heuristic may include identifying subpatterns of each pattern and for each pattern, maximizing a number of consecutive text characters in the subpattern selected by selecting a given subpattern of the subpatterns identified based on the given subpattern having a largest number of consecutive text characters of the subpatterns identified and based on the given subpattern being unique among all subpatterns selected for the set of one or more regular expressions. As disclosed above, maximizing length of the subpattern selected may enable higher probability of a match in the at least one NFA.

The at least one heuristic may include prioritizing given subpatterns of each pattern based on a subpattern type of each of the given subpatterns and lengths of the given subpatterns. The subpattern type may be text only, alternation, single character repetition, or multi-character repetition, and a priority order from highest to lowest for the subpattern type may be text only, alternation, single character repetition, and multi-character repetition. As such, subpatterns that are text strings having a length of at least a minimum length threshold may be prioritized higher than complex subpatterns of variable length.

The compiler 306 may prioritize a longer length subpattern over another subpattern of lesser length. The compiler 306 may select a unique subpattern as the subpattern selected, based on the prioritizing. As described above, the unique subpattern selected may have a length of at least a minimum length threshold.

The compiler 306 may select a non-unique subpattern as the subpattern selected, based on the prioritizing, if none of the given subpatterns are unique and have a length of at least the minimum length threshold. As such, the compiler 306 may select a subpattern from a pattern that is a duplicate of a subpattern selected from another pattern rather than select a subpattern having a length less than the minimum threshold. To facilitate finalizing of subpatterns, the compiler 306 may perform multiple passes over the patterns and sort possible subpatterns by length. As such, compiler subpattern selection for a given pattern in the set of one or more regular expressions 304 may be performed within a context of subpattern selection for other patterns in the set of one or more regular expressions 304.

As described above, the qualifiers 322 may indicate that reporting of a start offset is desired. However, the start offset may not be easily discernible. For example, finding a start offset in a payload matching patterns such as "a.*b" or "a.*d" may be difficult given a payload such as "axycamb" because two patterns may be matching, "axycamb" and "amb." As such, offsets for both instances of "a" in the payload may need to be tracked as potential start offsets. According to embodiments disclosed herein, potential start offsets need not be tracked, as the start offset is not determined until a match of the entire pattern is determined to have been found in a payload. Determining the match of the entire pattern may be found utilizing match results from the unified DFA, the at least one NFA, or a combination thereof.

According to embodiments disclosed herein, if a payload in the received packets 101 includes content that matches a subpattern selected 318 from a pattern 316, the walker may transition to walk at least one NFA for the subpattern selected 318. The walker 320 may report a match of the subpattern selected 318 and an offset that identifies a location in the received packets of the last character of the matching subpattern as an end offset for the subpattern in the payload. A subpattern match may be a partial match for the pattern if the subpattern is a subset of the pattern. As such, the walker 320 may continue the search for the remainder of the pattern in the payload by walking at least one NFA for the pattern, in order to determine a final match for the pattern. It should be understood that the pattern may traverse one or more payloads in the received packets 101a.

Figure 3B:
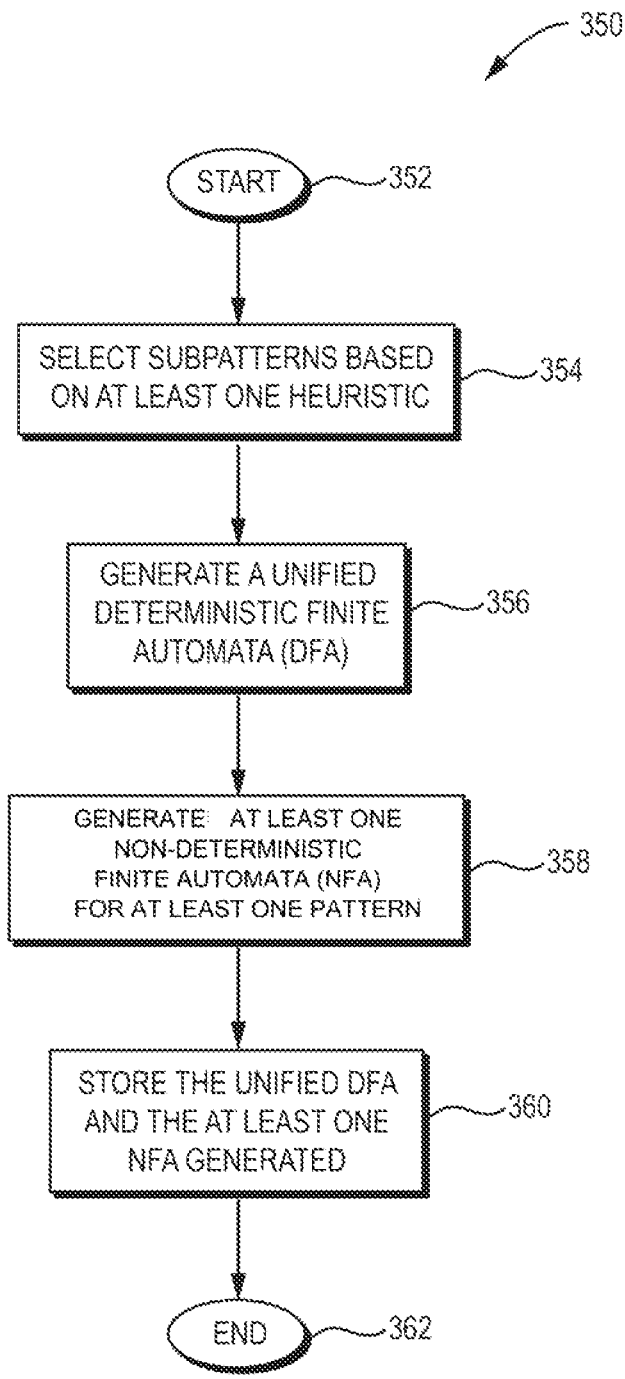
FIG. 3B is a flow diagram of an example embodiment of a method that may be implemented in at least one processor operatively coupled to at least one memory in a security appliance operatively coupled to a network.

FIG. 3B is a flow diagram (350) of an example embodiment of a method that may be implemented in at least one processor operatively coupled to at least one memory in a security appliance operatively coupled to a network. The method may begin (352) and select a subpattern from each pattern in a set of one or more regular expression patterns based on at least one heuristic (354). The method may generate a unified deterministic finite automata (DFA) using the subpatterns selected from all patterns in the set (356). The method may generate at least one non-deterministic finite automata (NFA) for at least one pattern in the set, a portion of the at least one pattern used for generating the at least one NFA, and at least one walk direction for run time processing of the at least one NFA, being determined based on whether a length of the subpattern selected is fixed or variable and a location of the subpattern selected within the at least one pattern (358). The method may store the unified DFA and the at least one NFA generated in the at least one memory (360). The method thereafter ends (362) in the example embodiment.

As disclosed above, the compiler 306 may generate the unified DFA 312 and the at least one NFA 314 to enable the walker 320 to search for matches of one or more regular expression patterns in the set of one or more regular expressions 304 in received packets 101a. The compiler 306 may select a subpattern from each pattern in the set of one or more regular expression patterns 304 based on at least one heuristic. The unified DFA 312 may be generated using the subpatterns selected 302 from all patterns in the set of one or more regular expressions 304. The compiler 306 may generate at least one NFA 314 for at least one pattern 316 in the set of one or more regular expressions 304. A portion of the at least one pattern used for generating the at least one NFA 314, and at least one walk direction for run time processing of the at least one NFA 314, may be determined based on whether a length of the subpattern selected 318 is fixed or variable and a location of the subpattern selected 318 within the at least one pattern 316, as disclosed with reference to FIGS. 4-11, below.

Figure 4:
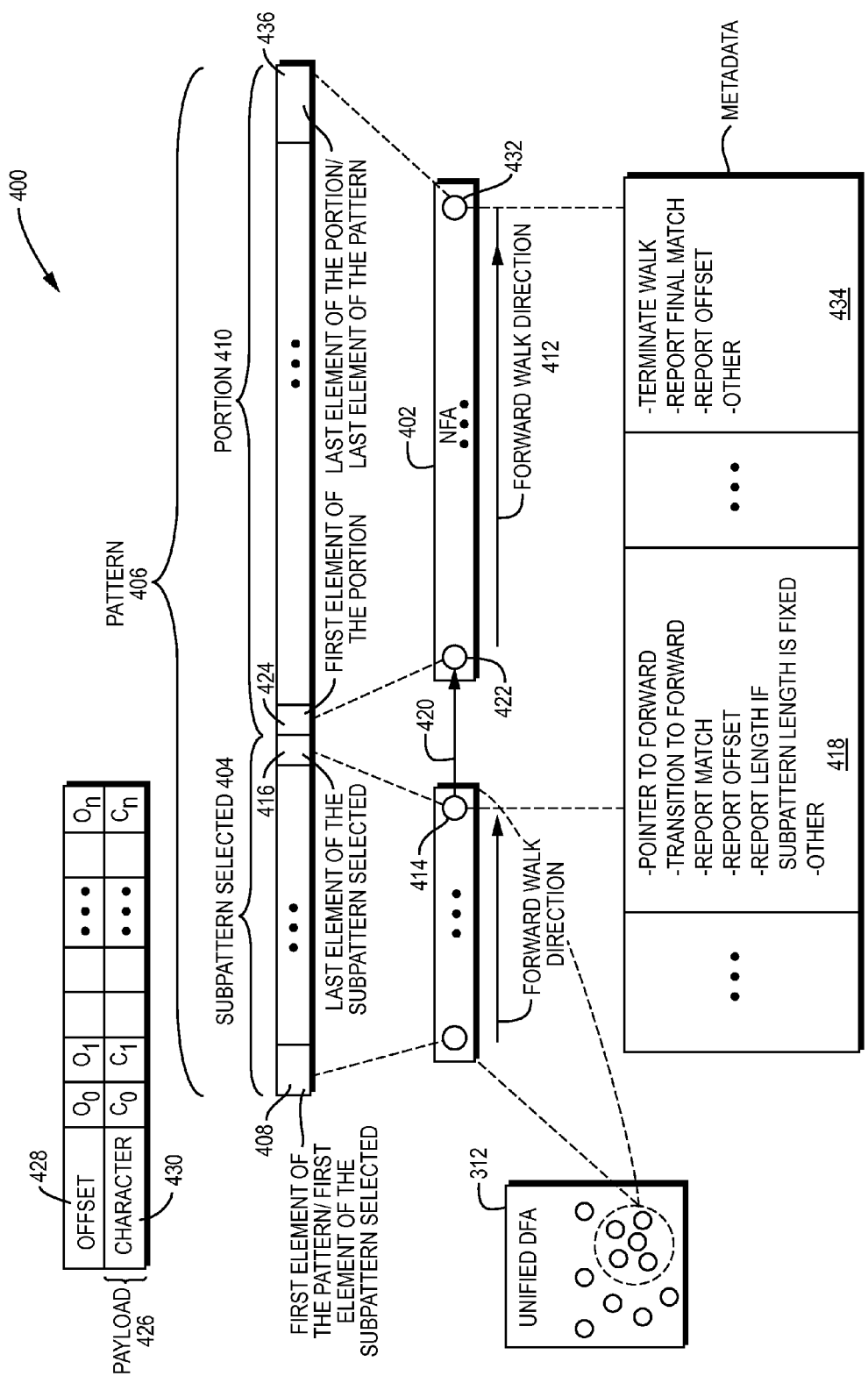
FIG. 4 is a block diagram of an embodiment for generating a unified DFA and at least one NFA based on the length of a subpattern selected being fixed, and a location of the subpattern selected being a beginning-location of a regular expression pattern.

FIG. 4 is a block diagram 400 for generating the unified DFA 312 and the at least one NFA 314 based on a length of a subpattern selected 404 being fixed, and a location of the subpattern selected being a beginning-location of at least one pattern 406. As shown in FIG. 4, a first element 408 of the subpattern selected 404 is a first element of the at least one pattern 406. The portion 410 of the at least one pattern 406 used for generating the at least one NFA 402 may be the at least one pattern 406 excluding the subpattern selected 404. The at least one NFA 314 may be a single NFA 402, and the at least one walk direction of the at least one NFA 314 may be a forward walk direction 412. For example, for a given pattern such as "cavium," a forward walk direction would walk the input payload through nodes of the at least one NFA 314 in a walk direction from "c" to "m," whereas a reverse walk direction would walk the input payload in a walk direction from "m" to "c."

According to the example embodiment of FIG. 4, the compiler 306 may associate a DFA node 414, of the unified DFA 312, that is associated with the last element 416 of the subpattern selected 404, with metadata 418. The metadata 418 may indicate to the walker 320, configured to walk the unified DFA 312 and the at least one NFA 314 with a payload 426, a pointer 420 to a starting node 422 of single NFA 402. The metadata 418 may include an instruction to transition to walk the single NFA 402 in the forward walk direction 412. The starting node 422 of the single NFA 402 may be associated with the first element 424 of the portion 410 of the at least one pattern 406 used for generating the single NFA 402. The metadata 418 may indicate to the walker 320 to report a match of the subpattern selected 404, a lead offset (of offsets 428) within the payload 426, of a lead character (of characters 430) that matches the last element 416 of the subpattern selected 404 at the DFA node 414, as an end offset of the subpattern selected, and a length of the subpattern selected. A starting offset of payload for walking the single NFA 402 may be an offset of a byte subsequent to the byte at the end offset in the payload 426. For example, a next character in the payload for starting a walk of the single NFA 402 at the starting node 422 may be determined as being byte subsequent to the byte at the end offset in the payload. Since the length of the subpattern selected is fixed, the compiler 306 may determine a length of the subpattern selected and include it in the metadata 418. The walker 320 may use the length included in the metadata 418 in order to determine a start offset of the pattern 406 within the payload 426. For example, the walker 320 may determine the start offset, if required by a qualifier of the qualifiers 308, by subtracting the length included in the metadata 418 from the end offset determined.

It should be understood that reporting may be performed in any suitable manner. For example, the walker 320 may report an end offset by declaring the end offset to the network services processor 100, for example, by writing to a memory location, triggering an interrupt, sending or posting a message, etc. Alternatively, the walker 320 may report an end offset or any other offset or information based on matching results by declaring the end offset or other ascertained result in its own data structures for use within a process of the walker itself.

According to the example embodiment of FIG. 4, the compiler 306 may associate an NFA node 432, of the single NFA generated, with metadata 434 indicating to the walker an instruction to terminate the walk because a final match of the entire pattern 406 has been identified. The NFA node 432 may be associated with a last element 436 of the at least one pattern 406. The metadata 434 may indicate the walker 320 to report a lag offset (of offsets 428) within the payload 426, of a lag character (of characters 430) that matches at the NFA node 432, as an end offset of the at least one pattern 406 as well as a final match of the at least one pattern 406.

The walker 320 may correlate each walk for a given pattern with a transaction identifier. As such, subpattern length, payload character offsets, and pattern matching results may be reported in association with the corresponding transaction identifier. In the example embodiment, the network services processor 100 may correlate walker result information for a given pattern based on a transaction identifier for a walk to search for the given pattern.

Figure 5:
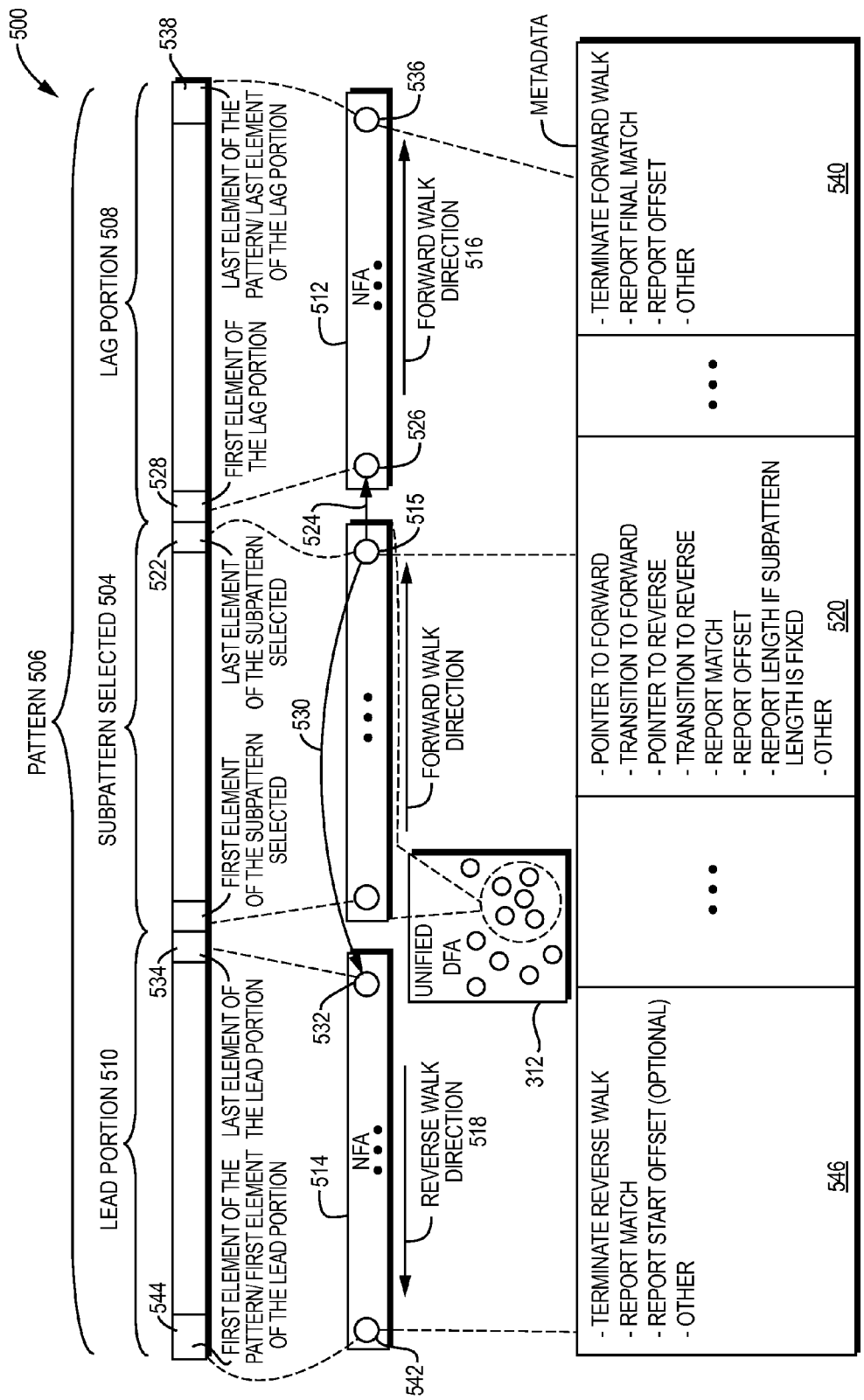
FIG. 5 is a block diagram of an embodiment for generating a unified DFA and at least one NFA based on a location of a subpattern selected being a mid-location of a regular expression pattern and a length of the subpattern selected being fixed.

FIG. 5 is a block diagram 500 of an embodiment for generating the unified DFA 312 and the at least one NFA 314 based on a location of a subpattern selected 504 being a mid-location of at least one pattern 506 and a length of the subpattern selected 504 being fixed. According to the example embodiment of FIG. 5, a portion of the at least one pattern 506 for generating the at least one NFA 314, includes a lag portion 508 and a lead portion 510 of the at least one pattern 506. As shown in FIG. 5, the lag portion 508 of the at least one pattern 506 may be the at least one pattern 506 excluding the subpattern selected 504 and the lead portion 510 of the at least one pattern 506. The lead portion 510 of the at least one pattern 506 excludes the subpattern selected 504 and the lag portion 508 of the at least one pattern 506.

According to the example embodiment of FIG. 5, the at least one NFA 314 includes a lag NFA 512 and a lead NFA 514. The at least one walk direction includes a forward walk direction 516 and a reverse walk direction 518. The lag NFA 512 may be walked in the forward walk direction 516 and the lead NFA 514 may be walked in the reverse walk direction 518. The lag portion 508 of the at least one pattern 506 may be used for generating the lag NFA 512 and the lead portion 510 of the at least one pattern 506 may be used for generating the lead NFA 514.

According to the example embodiment of FIG. 5, the compiler 306 may associate a DFA node 515 of the unified DFA 312 with the last element 522 of the subpattern selected 504 with metadata 520. The metadata 520 may indicate to a walker, configured to walk the unified DFA 312 and the at least one NFA 314 with a payload, such as the payload 426 of FIG. 4. The metadata 520 may include a pointer 524 to a starting node 526 of the lag NFA 512, an instruction to transition the walker 320 to walk the lag NFA 512 in the forward walk direction 516 with payload starting at an offset of a byte subsequent to a byte at the end offset in the payload 426. The starting node 526 of the lag NFA 512 may be associated with a first element 528 of the lag portion 508. The metadata 520 may indicate a pointer 530 to a starting node 532 of the lead NFA 514 and an instruction for the walker 320 to transition to walk the lead NFA 514 in the reverse walk direction 518. The starting node 532 of the lead NFA 514 may be associated with a last element 534 of the lead portion 510. The metadata 520 may indicate to the walker 320 to report an offset (of offsets 428) within the payload 426, of a character (of characters 430) matching the last element 522 of the subpattern selected 504 at the DFA node 515, as an end offset of the subpattern selected 504, a match of the subpattern selected, and a length of the subpattern selected. The walker 320 may use the length included in the metadata 520 in order to determine a starting offset of payload for starting a reverse walk at the starting node 532 by subtracting the length of the subpattern selected in the metadata 520 from the end offset of the subpattern selected 504.

According to the example embodiment of FIG. 5, the compiler 306 may associate a lag node 536 of the lag NFA 512 that is associated with the last element 538 of the at least one pattern 506, with metadata 540. The metadata 540 may indicate to the walker 320 an instruction to terminate walking the lag NFA 512, and to report a lag offset (of offsets 428) within the payload 426, of a lag character (of characters 430) of the payload 426 that matches the last element 538 at the lag node 536. The metadata 540 may indicate to the walker 320 to report a match of the lag portion 508 of the at least one pattern 506.

According to the example embodiment of FIG. 5, the compiler 306 may associate a lead node 542 of the lead NFA 514 that is associated with the first element 544 of the at least one pattern 506, with metadata 546 indicating to the walker 320 an instruction to terminate walking the lead NFA 514. The metadata 546 may indicate to the walker 320 to report a match of the lead portion 510 of the at least one pattern 506. The metadata 546 may indicate to the walker 320 to report a lead offset (of offsets 428) within the payload 426, of a lead character (of characters 430) of the payload 426, that matches the first element 544 at the lead node 542, as a start offset of the at least one pattern 506, if required by a qualifier, such as one of the qualifiers 308, associated with the at least one pattern 506.

Figure 6:
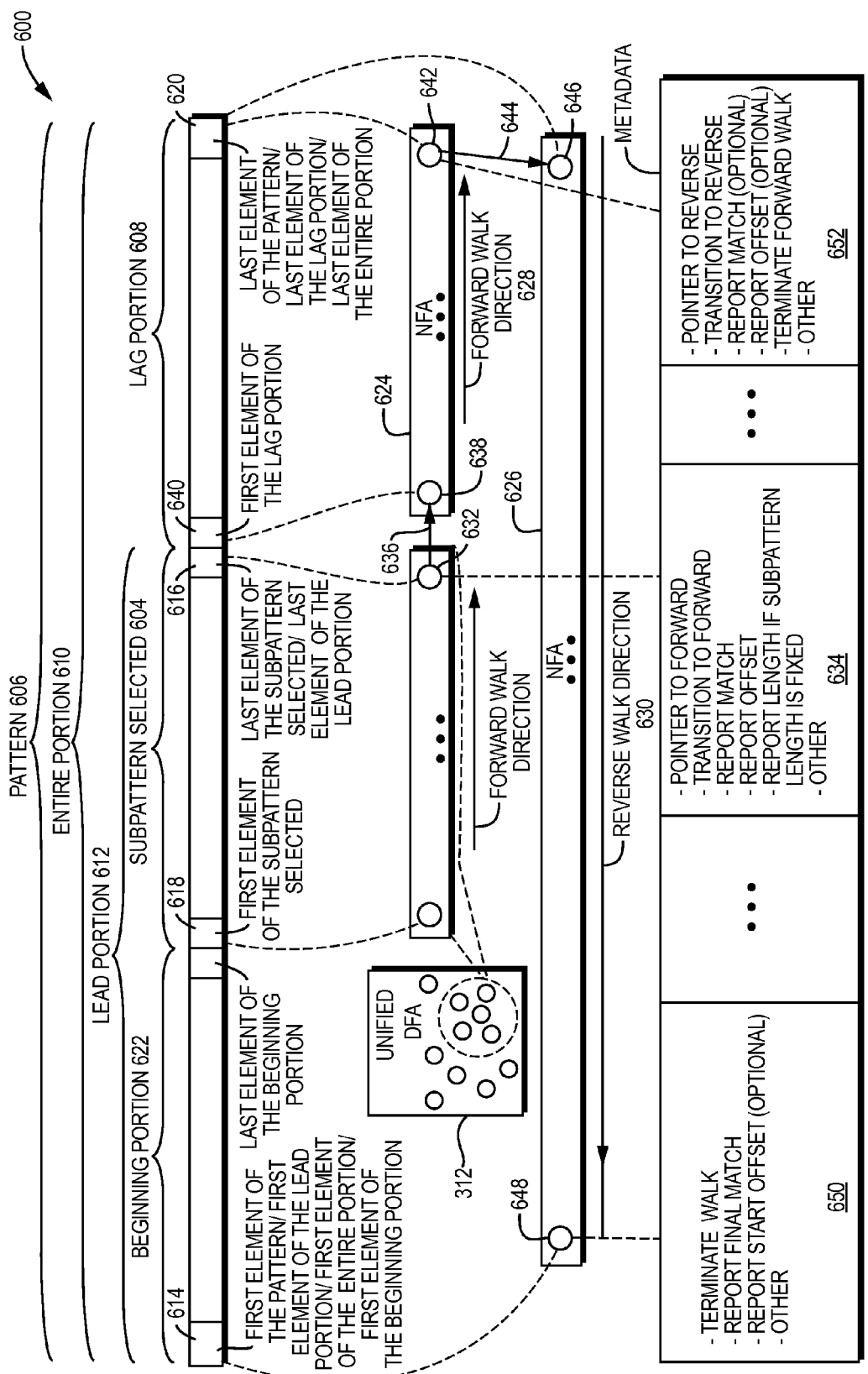
FIG. 6 is a block diagram of an embodiment for generating a unified DFA and at least one NFA based on location of a subpattern selected being a mid-location or a beginning location of a regular expression pattern and a length of the subpattern being fixed or variable.

FIG. 6 is a block diagram 600 of an embodiment for generating the unified DFA 312 and the at least one NFA 314 based on a location of the subpattern selected being a mid-location or a beginning location of the at least one pattern and the length of the subpattern being fixed or variable. According to the example embodiment of FIG. 6, the portion of the at least one pattern 606 for generating the at least one NFA 314 includes a lag portion 608 and an entire portion 610 of the at least one pattern 606. The lag portion 608 of the at least one pattern 606 may be the at least one pattern 606 excluding a lead portion 612 of the at least one pattern 606. The lead portion 612 includes the first element 614 of the at least one pattern 606, the last element 616 of the subpattern selected 604, and all elements in the at least one pattern 606 therebetween. The entire portion 610 of the at least one pattern 606 may be the at least one pattern 606.

If the first element 618 of the subpattern selected 604 is not a first element 614 of the at least one pattern 606, and a last element 616 of the subpattern selected 604 is not a last element 620 of the at least one pattern 606, the location of the subpattern selected is a mid-location of the at least one pattern 606, and a beginning portion 622 precedes the subpattern selected 604 in the at least one pattern 606.

If the first element 618 of the subpattern selected 604 is the first element 614 of the at least one pattern, the location of the subpattern selected is the beginning-location of the at least one pattern 606. If the location of the subpattern selected is the beginning-location, the beginning portion 622 does not exist, and the lead portion 612 is the subpattern selected 604.

According to the example embodiment of FIG. 6, the at least one NFA includes a lag NFA 624 and an umbrella NFA 626. The at least one walk direction includes a forward walk direction 628 and a reverse walk direction 630. The lag NFA 624 has the forward walk direction 628 and the umbrella NFA 626 has the reverse walk direction 630. The lag portion 608 of the at least one pattern 606 may be used by the compiler 306 for generating the lag NFA 624. The entire portion 610 of the at least one pattern 606 may be used by the compiler 306 for generating the umbrella NFA 626.

According to the example embodiment of FIG. 6, the compiler 306 may associate a DFA node 632 of the unified DFA 312 with the last element 616 of the subpattern selected 604 with metadata 634. The metadata 634 may indicate to the walker 320 a pointer 636 to a starting node 638 of the lag NFA 624 and an instruction to transition to walk the lag NFA 624 in the forward walk direction 628. The starting node 638 of the lag NFA 624 may be associated with a first element 640 of the lag portion 608. The metadata 634 may indicate to the walker 320 to report a match of the subpattern selected 604 and an offset (of offsets 428) within the payload 426, of a character (of characters 430) that matches the last element 616 of the subpattern selected 604 at the DFA node, as an end offset of the subpattern selected 604, and a length of the subpattern selected 604, if the length is fixed.

According to the example embodiment of FIG. 6, the compiler 306 may associate a lag node 642 of the lag NFA 624 associated with the last element 620 of the at least one pattern 606 with metadata 652. The metadata 652 may indicate to the walker 320 a pointer 644 to a starting node 646 of the umbrella NFA 626, an instruction to transition to walk the umbrella NFA 626 in the reverse walk direction 630. The starting node 646 of the umbrella NFA 626 may be associated with the last element 620 of the at least one pattern 606. The metadata 652 may indicate to the walker to optionally report an offset (of the offsets 428) within the payload 426, of a character (of the characters 430) that matches the last element 620 of the at least one pattern 606 at the lag node 642, and to optionally report a match of the lag portion 608 of the at least one pattern 606.

According to the example embodiment of FIG. 6, the compiler 306 may associate an umbrella node 648 of the umbrella NFA 626 that is associated with the first element 614 of the at least one pattern 606, with metadata 650. The metadata 650 may indicate to the walker 320, an instruction to terminate the walk and to report a final match of the at least one pattern 606. The metadata 650 may indicate to the walker to report a start offset (of offsets 428) within the payload 426, of a start character that matches the first element 614 of the at least one pattern 606 at the umbrella node 648, as a start offset of the at least one pattern 606, if required by a qualifier of the qualifiers 308 associated with the at least one pattern 606.

Figure 7:
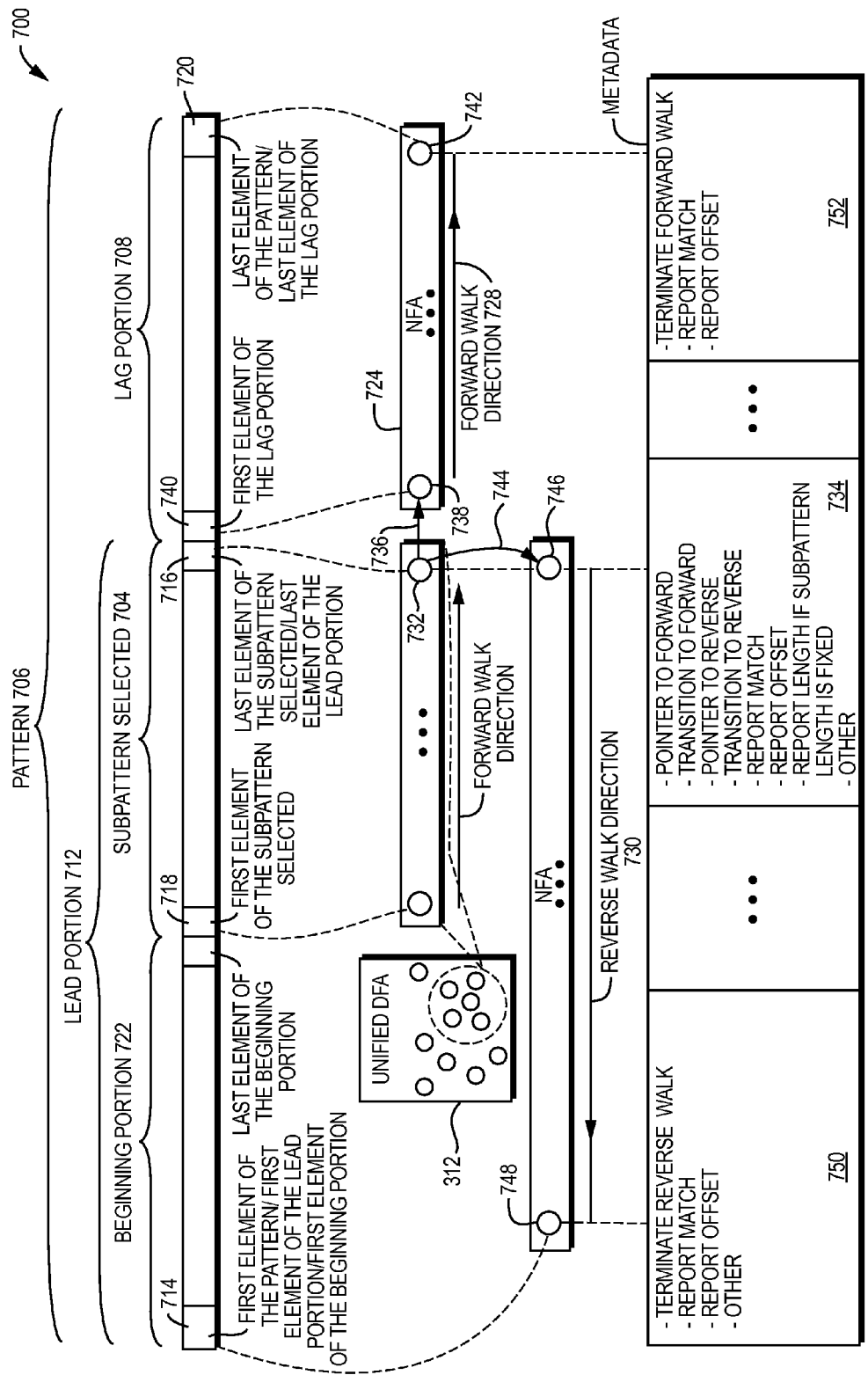
FIG. 7 is a block diagram of another embodiment for generating a unified DFA and at least one NFA based on location of a subpattern selected being a mid-location or a beginning location of a regular expression pattern and a length of the subpattern selected being fixed or variable.

FIG. 7 is a block diagram 700 of another embodiment for generating the unified DFA 312 and the at least one NFA 314 based on the location of the subpattern selected 704 being the mid-location or the beginning location of the at least one pattern 706 and the length of the subpattern selected 704 being fixed or variable. According to the example embodiment of FIG. 7, the portion of the at least one pattern for generating the at least one NFA 314 includes a lag portion 708 and a lead portion 712 of the at least one pattern 706. The lag portion 708 of the at least one pattern 706 may be at least one pattern 706 excluding the lead portion 712 of the at least one pattern 706. The lead portion 712 includes the first element 714 of the at least one pattern 706, the last element 716 of the subpattern selected 704, and all elements in the at least one pattern 706 therebetween. The lead portion 712 may be the subpattern selected 704 if the location of the subpattern selected is the beginning-location.

If the first element 718 of the subpattern selected 704 is not a first element 714 of the at least one pattern 706, and a last element 716 of the subpattern selected 704 is not a last element 720 of the at least one pattern 706, the location of the subpattern selected is a mid-location of the at least one pattern 706, and a beginning portion 722 precedes the subpattern selected 704 in the at least one pattern 606.

If the first element 718 of the subpattern selected 704 is the first element 714 of the at least one pattern, the location of the subpattern selected is the beginning-location of the at least one pattern 706. If the location of the subpattern selected is the beginning-location, the beginning portion 722 does not exist, and the lead portion 712 is the subpattern selected 704.

According to the example embodiment of FIG. 7, the at least one NFA 314 includes a lag NFA 724 and a lead NFA 726, the at least one walk direction includes a forward walk direction 728 and a reverse walk direction 730. The lag NFA 724 has the forward walk direction 728. The lead NFA 726 has the reverse walk direction 730. The lag portion 708 of the at least one pattern 706 may be used for generating the lag NFA 724. The lead portion 712 of the at least one pattern 706 may be used for generating the lead NFA 726.

According to the example embodiment of FIG. 7, the compiler 306 may associate a DFA node 732 of the unified DFA 312 that is associated with the last element 716 of the subpattern selected 704, with metadata 734. The metadata 734 may indicate to the walker 320 a pointer 736 to a starting node 738 of the lag NFA 724, and an instruction to transition to walk the lag NFA 724 in the forward walk direction 728. The starting node 738 of the lag NFA 724 may be associated with a first element 740 of the lag portion 708. A starting offset of payload for starting the forward walk of the lag NFA 724 may be an offset of a byte subsequent to a byte at the end offset of the subpattern selected 704. The metadata 734 may indicate to the walker 320 a pointer 744 to a starting node 746 of the lead NFA 726, and an instruction to transition to walk the lead NFA 726 in the reverse walk direction 730. The starting node 746 of the lead NFA 726 may be associated with a last element 716 of the subpattern selected 704. An offset of payload for starting the reverse walk of the lead NFA 726 may be the end offset of the subpattern selected 704. The metadata 734 may indicate to the walker 320 to report a match of the subpattern selected 704 and an offset (of the offsets 428) within the payload 426, of a character (of the characters 430) that matches the last element 716 of the subpattern selected 704 at the DFA node 732, as an end offset of the subpattern selected 704, and a length of the subpattern selected 704, if the length is fixed.

According to the example embodiment of FIG. 7, the compiler 306 may associate a lag node 742 of the lag NFA 724 that is associated with the last element 720 of the at least one pattern 706, with metadata 752. The metadata 752 may indicate to the walker 320 to terminate walking the lag NFA, and to report a lag offset (of the offsets 428) within the payload 426, of a lag character (of the characters 430) matching the last element 720 of the at least one pattern 706 at the lag node 742, and to report a match of the lag portion 708 of the at least one pattern 706.

According to the example embodiment of FIG. 7, the compiler 306 may associate a lead node 748 of the lead NFA 726 generated that is associated with the first element 714 of the at least one pattern 706, with metadata 750. The metadata 750 may indicate to the walker 320 an instruction to terminate walking the lead NFA 726 and to report a match of the lead portion 712 and a lead offset (of the offsets 428) within the payload, of a lead character (of the characters 430) that matches the first element 714 of the at least one pattern 706 at the lead node 748.

The embodiment of FIG. 7 may be viewed as an optimization of the embodiment of FIG. 6 because the walker 320 need not traverse an NFA for the lag portion 708 in a reverse direction.

Figure 8:
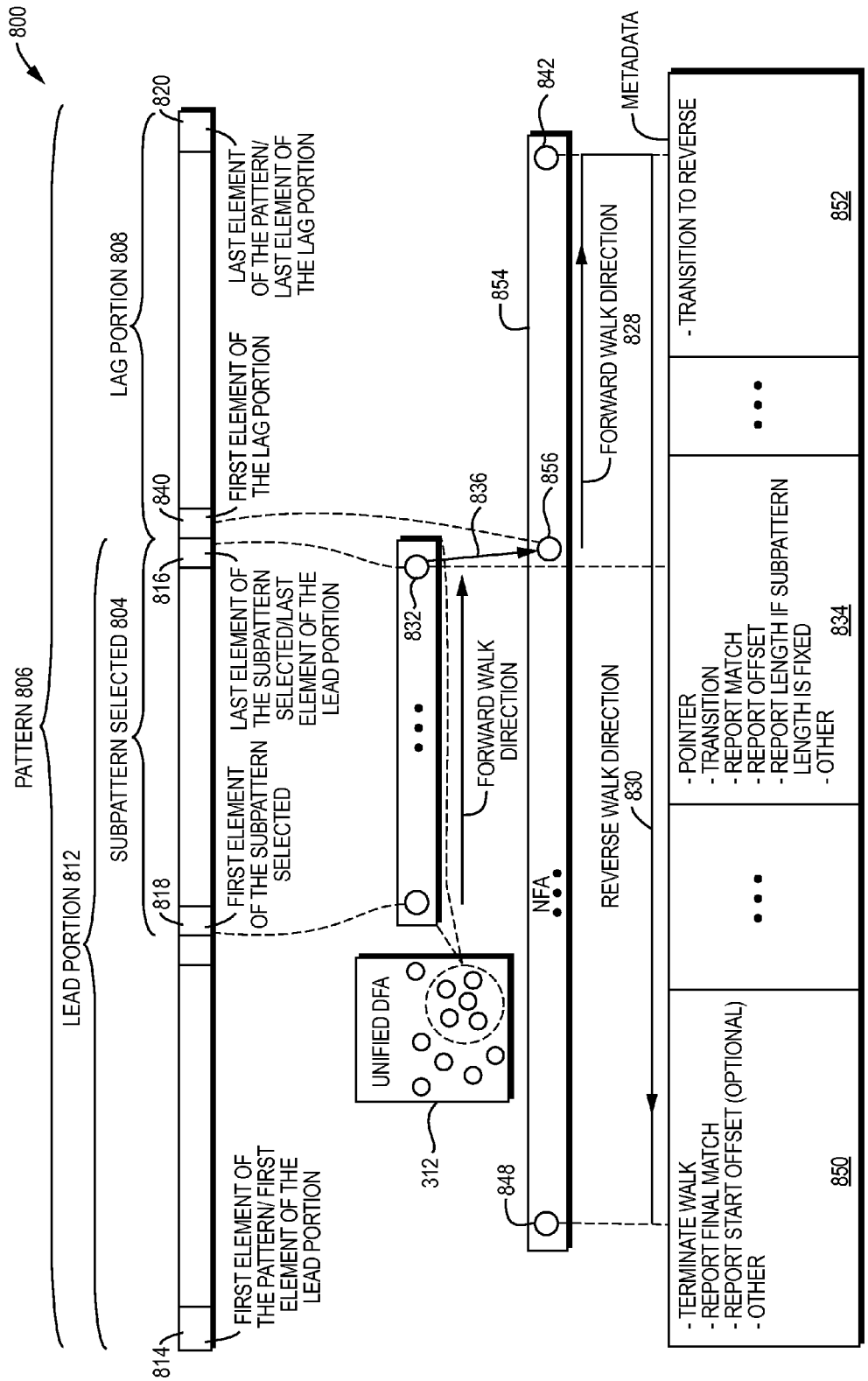
FIG. 8 is a block diagram of an embodiment for generating a unified DFA and at least one NFA based on a location of a subpattern selected being a mid-location of a regular expression pattern and a length of the subpattern selected being fixed or variable.

FIG. 8 is a block diagram 800 of an embodiment for generating the unified DFA 312 and the at least one NFA 314 based on the location of the subpattern selected 804 being the mid-location of the at least one pattern 806, and the length of the subpattern selected 804 being fixed or variable. According to the example embodiment of FIG. 8, the at least one NFA 314 is a single NFA 854. The at least one walk direction includes a forward walk direction 828, for run time processing nodes of the single NFA 854 associated with elements of a lag portion 808 of the at least one pattern 806, and a reverse walk direction 830, for run time processing nodes of the single NFA 854 associated with all elements of the at least one pattern 806. The lag portion 808 of the at least one pattern 806 is the at least one pattern 806 excluding a lead portion 812 of the at least one pattern 806. The lead portion 812 includes the first element 814 of the at least one pattern 806, the last element 816 of the subpattern selected 804, and all elements in the at least one pattern 806 therebetween.

According to the example embodiment of FIG. 8, the compiler 306 may associate a DFA node 832 of the unified DFA 312 that is associated with the last element 816 of the subpattern selected 804, with metadata 834. The metadata 834 may indicate to the walker 320 a pointer 836 to a starting node 856 of the single NFA 854 and an instruction to transition to walk the single NFA 854 in the forward walk direction 828. The starting node 856 may be associated with a next element 840 in the at least one pattern 806 immediately following the last element 816 of the subpattern selected 804. The metadata 834 may indicate to the walker 320 to report a match of the subpattern selected 804, an offset (of the offsets 428) within the payload 426, of a character (of the characters 430) that matches the last element 816 of the subpattern selected 804 at the DFA node 832, as an end offset of the subpattern selected 804, and a length of the subpattern selected 804, if the length is fixed.

According to the example embodiment of FIG. 8, the compiler 306 may associate a lag node 842 of the single NFA 854, associated with a last element 820 of the at least one pattern 806, with metadata 852 indicating to the walker 320 an instruction to transition to walk the single NFA 854 in the reverse walk direction 830 with payload starting at the end offset of the subpattern selected. The compiler 306 may associate a lead node 848 of the single NFA 854, associated with the first element 814 of the at least one pattern 806, with metadata 850. The metadata 850 may indicate to the walker 320 an instruction to terminate the walk, and to report an offset (of the offsets 428) within the payload 426, of a character (of the characters 430) matching the first element 814 of the at least one pattern 806 at the lead node 848, as a start offset of the at least one pattern 806, if required by a qualifier of the qualifiers 308 associated with the at least one pattern 806, and a final match of the at least one pattern 806.

Figure 9:
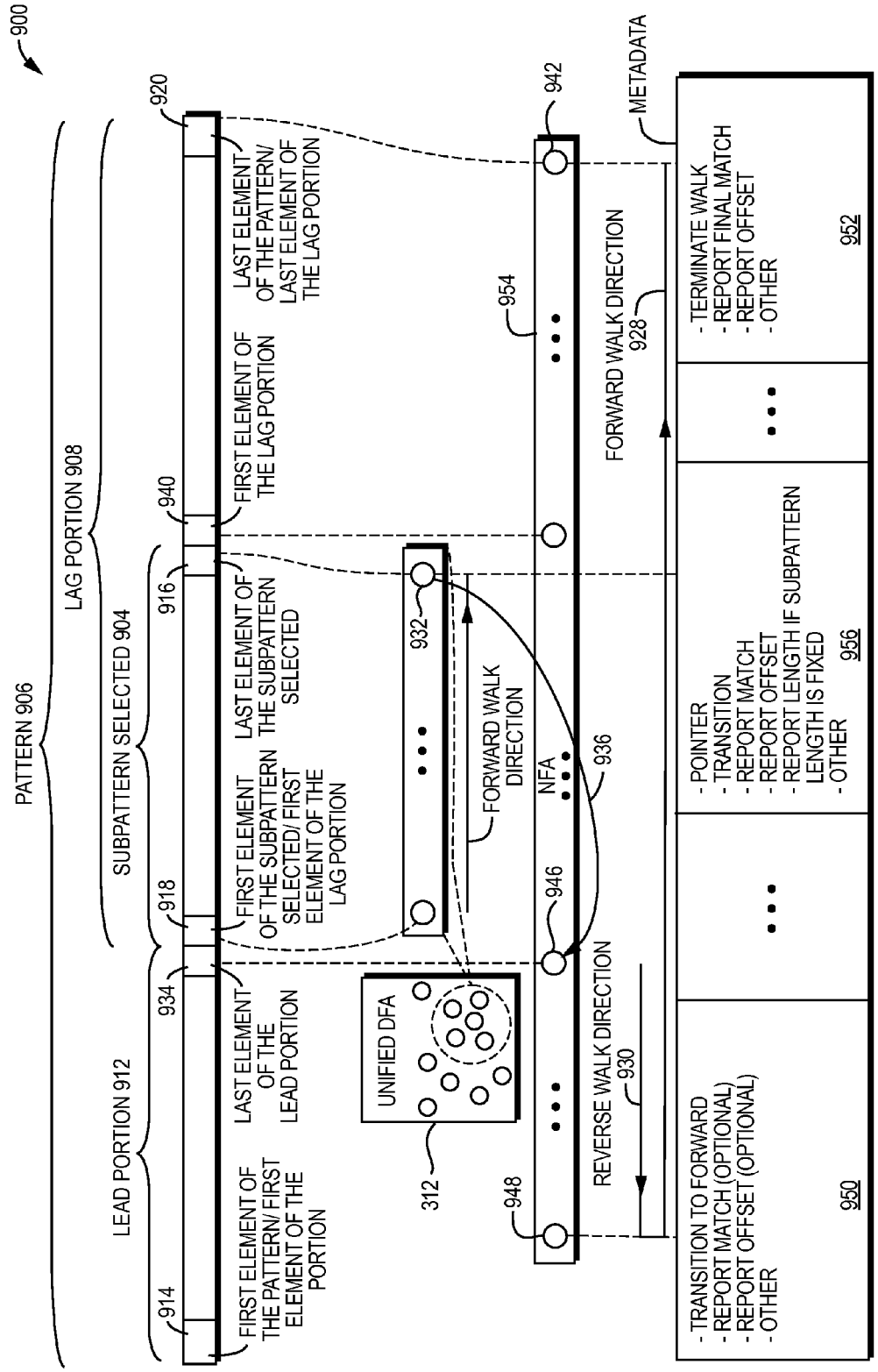
FIG. 9 is a block diagram of an embodiment for generating a unified DFA and at least one NFA based on a location of the subpattern selected being a mid-location of a regular expression pattern and a length of the subpattern selected being fixed.

FIG. 9 is a block diagram 900 of an embodiment for generating the unified DFA 312 and the at least one NFA 314 based on the location of the subpattern selected 904 being the mid-location of the at least one pattern 906, and the length of the subpattern selected 904 being fixed. According to the example embodiment of FIG. 9, the at least one NFA 314 may be a single NFA 954, and the at least one walk direction includes a reverse walk direction 930, for run time processing nodes of the single NFA 954 associated with a lead portion 912 of the at least one pattern 906 and a forward walk direction 928, for run time processing nodes of the single NFA 954 associated with all elements of the at least one pattern 906. The lead portion 912 may be the at least one pattern 906 excluding a lag portion 908 of the at least one pattern 906. The lag portion 908 includes the first element 918 of the subpattern selected 904, the last element 920 of the at least one pattern 906, and all elements in the at least one pattern 906 therebetween.

According to the example embodiment of FIG. 9, the compiler 306 may associate a DFA node 932 of the unified DFA 312, associated with the last element 916 of the subpattern selected 904, with metadata 956. The metadata 956 may indicate to the walker 320 a pointer 936 to a starting node 946 of the single NFA 954, and an instruction to transition to walk the single NFA 954 in the reverse walk direction 930. The starting node 946 may be associated with a last element 916 of the lead portion 912. The metadata 956 may indicate to the walker 320 to report a match of the subpattern selected 904. The metadata 956 may indicate to the walker 320 to report an offset (of the offsets 428) within the payload 426, of a character (of the characters 430) that matches the last element 916 of the subpattern selected 904 at the DFA node 932, as an end offset of the subpattern selected 904, and a length of the subpattern selected. The walker 320 may use the length if included in the metadata 956 in order to determine a payload starting offset of the starting node 946 by subtracting the length of the subpattern selected in the metadata 956 from the end offset of the subpattern selected.

According to the example embodiment of FIG. 9, the compiler 306 may associate a lead node 948 of the single NFA 954, associated with a first element 914 of the at least one pattern 906, with metadata 950. The metadata 950 may indicate to the walker 320 an instruction to transition to walk the single NFA 954 in the forward walk direction 928. The compiler 306 may associate a lag node 942 of the single NFA 954, associated with the last element 920 of the at least one pattern 906, with metadata 952. The metadata 952 may indicate to the walker 320 an instruction to terminate the walk. The metadata 952 may indicate to the walker to report an offset (of the offsets 428) within the payload 426, of a character (of the characters 430) that matches the last element 920 of the at least one pattern 906 at the lag node 942, and a final match of the at least one pattern 906.

Figure 10:
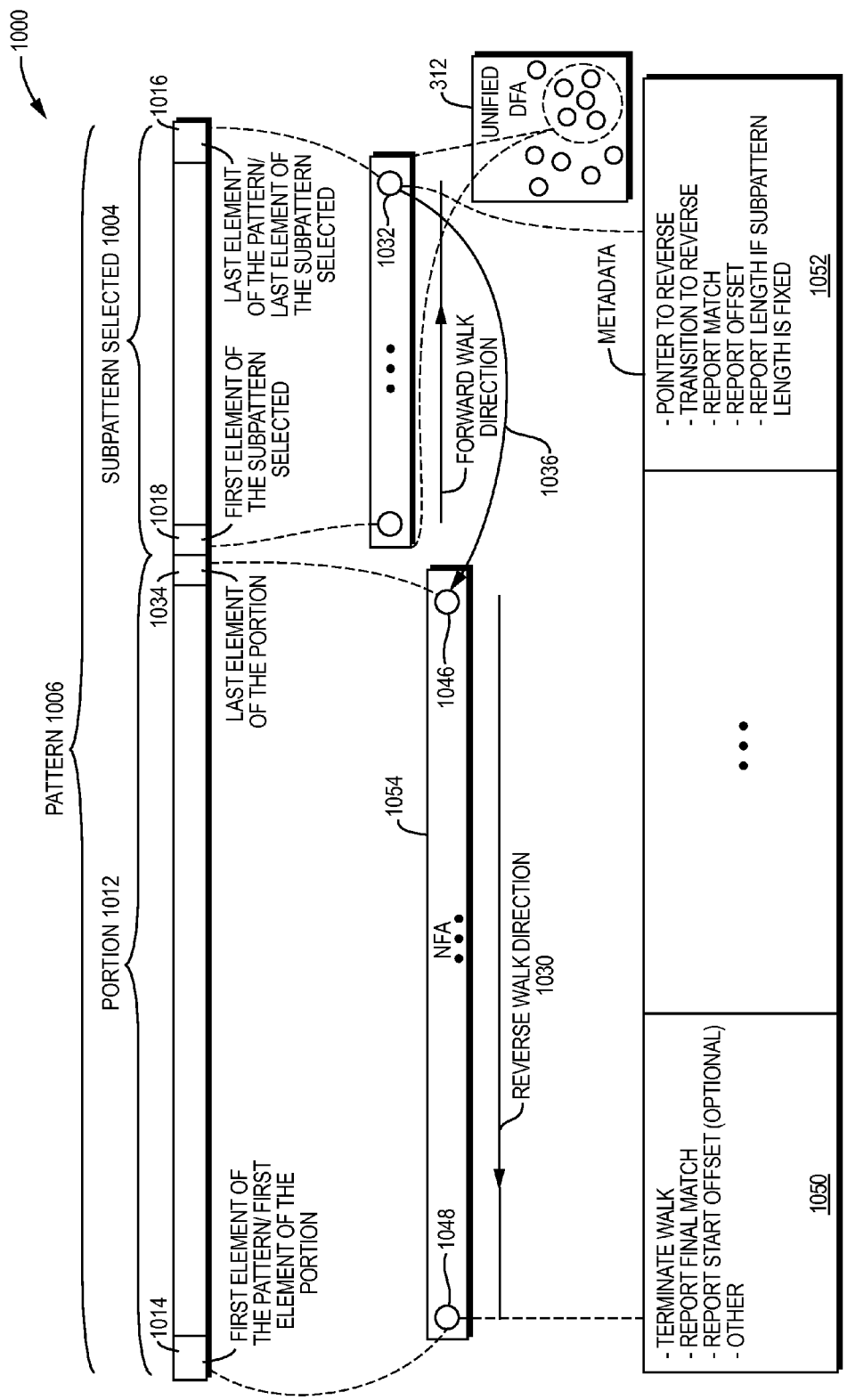
FIG. 10 is a block diagram of an embodiment for generating a unified DFA and at least one NFA based on a location of a subpattern selected being an end-location of a regular expression pattern and a length of the subpattern selected being fixed.

FIG. 10 is a block diagram 1000 of an embodiment for generating the unified DFA 312 and the at least one NFA 314 based on the location of the subpattern selected 1004 being an end-location of the at least one pattern 1006 and the length of the subpattern selected 1004 being fixed. According to the example embodiment of FIG. 10, if a last element 1016 of the subpattern selected 1004 may be a last element 1016 of the at least one pattern 1006, the location of the subpattern selected 1004 may be the end-location of the at least one pattern 1006, and the at least one NFA 314 may be a single NFA 1054. If the length of the subpattern selected 1004 is fixed, the portion 1012 of the at least one pattern 1006 for generating the single NFA 1054 may be the at least one pattern 1006 excluding the subpattern selected 1004. The at least one walk direction may be a reverse walk direction 1030 for walking the single NFA 1054.

According to the example embodiment of FIG. 10, the compiler 306 may associate a DFA node 1032, corresponding to the last element 1016 of the subpattern selected 1004, with metadata 1052. The metadata 1052 may indicate to the walker 320 a pointer 1036 to a starting node 1046 of the single NFA 1054 and an instruction to transition to walk the single NFA 1054 in a reverse walk direction 1030. The starting node 1046 of the single NFA 1054 is associated with a last element 1034 of the portion 1012. The metadata 1052 may indicate to the walker 320 to report a match of the subpattern selected 1004 and an offset (of the offsets 428) within the payload 426, of a character (of the characters 430) matching the last element 1016 of the subpattern selected 1004 at the DFA node 1032, as an end offset of the subpattern selected 1004, and a length of the subpattern selected 1004. The walker 320 may use the length if included in the metadata 1052 in order to determine a payload starting offset of the starting node 1046 by subtracting the length of the subpattern selected in the metadata 1052 from the end offset of the subpattern selected 1004.

According to the example embodiment of FIG. 10, the compiler 306 may associate an NFA node 1048 associated with a first element 1014 of the portion 1012, with metadata 1050. The metadata 1050 may indicate to the walker 320 to terminate the walk and to report a final match of the at least one pattern 1006 and an offset (of the offsets 428) within the payload 426, of a character (of the characters 430) that matches the first element 1014 of the portion 1012 at the NFA node 1048, as a start offset of the at least one pattern 1006, if required by a qualifier of the qualifiers 308 associated with the at least one pattern 1006.

Figure 11:
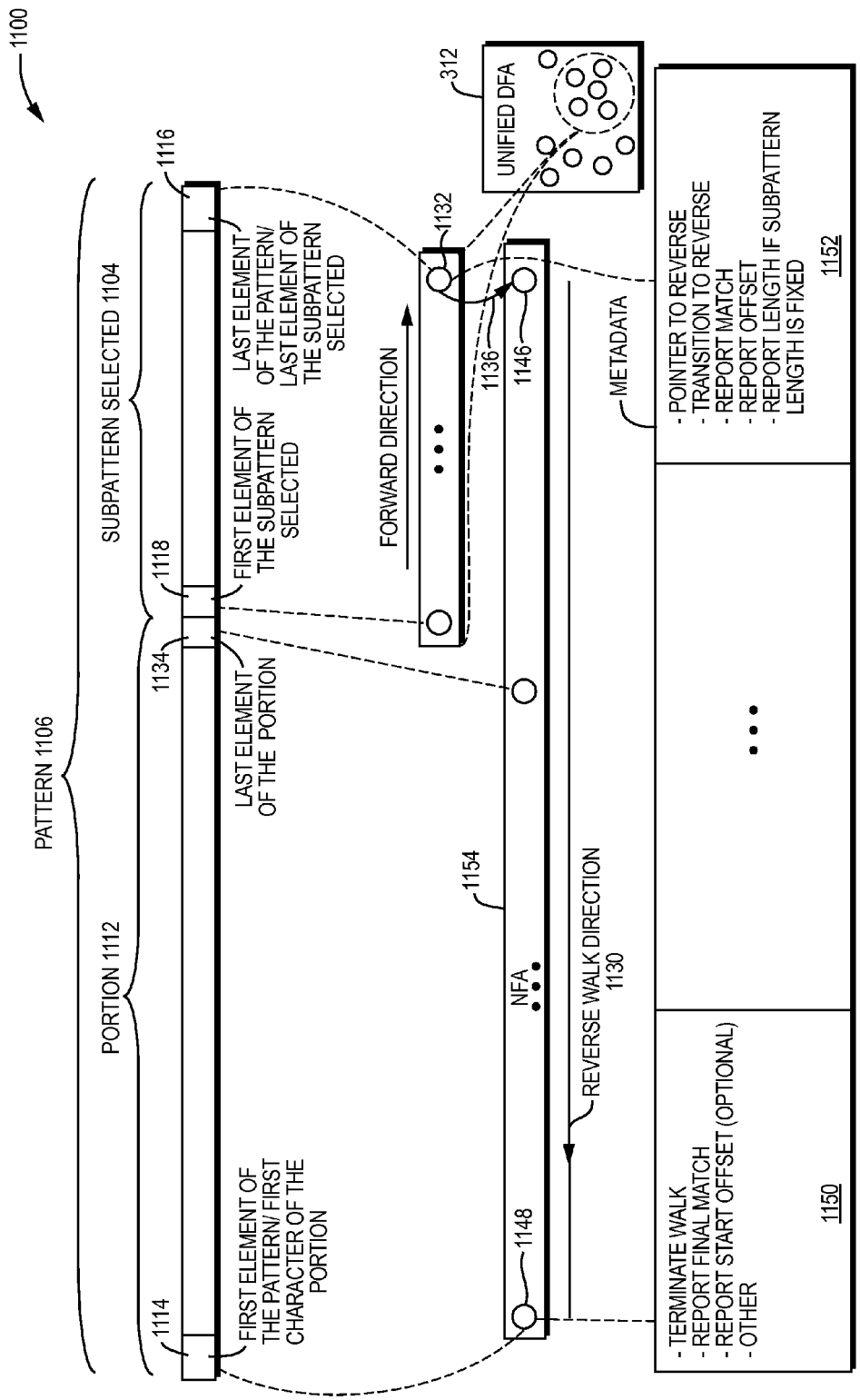
FIG. 11 is a block diagram of an embodiment for generating a unified DFA and at least one NFA based on a location of a subpattern selected being an end-location of a regular expression pattern and a length of the subpattern selected being variable or fixed.

FIG. 11 is a block diagram 1100 of an embodiment for generating the unified DFA 312 and the at least one NFA 314 based on the location of the subpattern selected 1104 being the end-location of the at least one pattern 1106 and the length of the subpattern selected 1004 being variable or fixed. According to the example embodiment of FIG. 11, if a last element 1116 of the subpattern selected 1104 may be a last element 1116 of the at least one pattern 1106, the location of the subpattern selected 1104 is the end-location of the at least one pattern 1106, and the at least one NFA 314 may be a single NFA 1154. If the length of the subpattern selected 1104 is fixed or variable, the portion 1112 of the at least one pattern 1106 for generating the single NFA 1154 may be the at least one pattern 1006. The at least one walk direction may be a reverse walk direction 1130 for walking the single NFA 1154.

According to the example embodiment of FIG. 11, the compiler 306 may associate a DFA node 1132, corresponding to the last element 1116 of the subpattern selected 1104, with metadata 1152. The metadata 1152 may indicate to the walker 320, a pointer 1136 to a starting node 1146 of the single NFA 1154 and an instruction to transition to walk the single NFA 1154 in a reverse walk direction 1130. The starting node 1146 of the single NFA 1154 may be associated with a last element 1116 of the subpattern selected 1104. The metadata 1152 may indicate to the walker 320 to report a match of the subpattern selected 1104 and an offset (of the offsets 428) within the payload 426, of a character (of the characters 430) that matches the last element 1116 of the subpattern selected 1104 at the DFA node 1132, as an end offset of the subpattern selected 1104, and a length of the subpattern selected 1104, if the length is fixed.

According to the embodiment of FIG. 11, the compiler 306 may associate an NFA node 1148, associated with a first element 1114 of the portion 1112, with metadata 1150. The metadata 1150 may indicate to the walker 320 to terminate the walk and to report a final match of the at least one pattern 1106. The metadata 1152 may indicate to the walker 320 to report an offset (of the offsets 428) within the payload 426, of a character (of the characters 430) matching the first element 1114 of the portion 1112 at the NFA node 1148, as a start offset of the at least one pattern 1106, if required by a qualifier, of the qualifiers 308, associated with the at least one pattern 1106.

Figure 12:
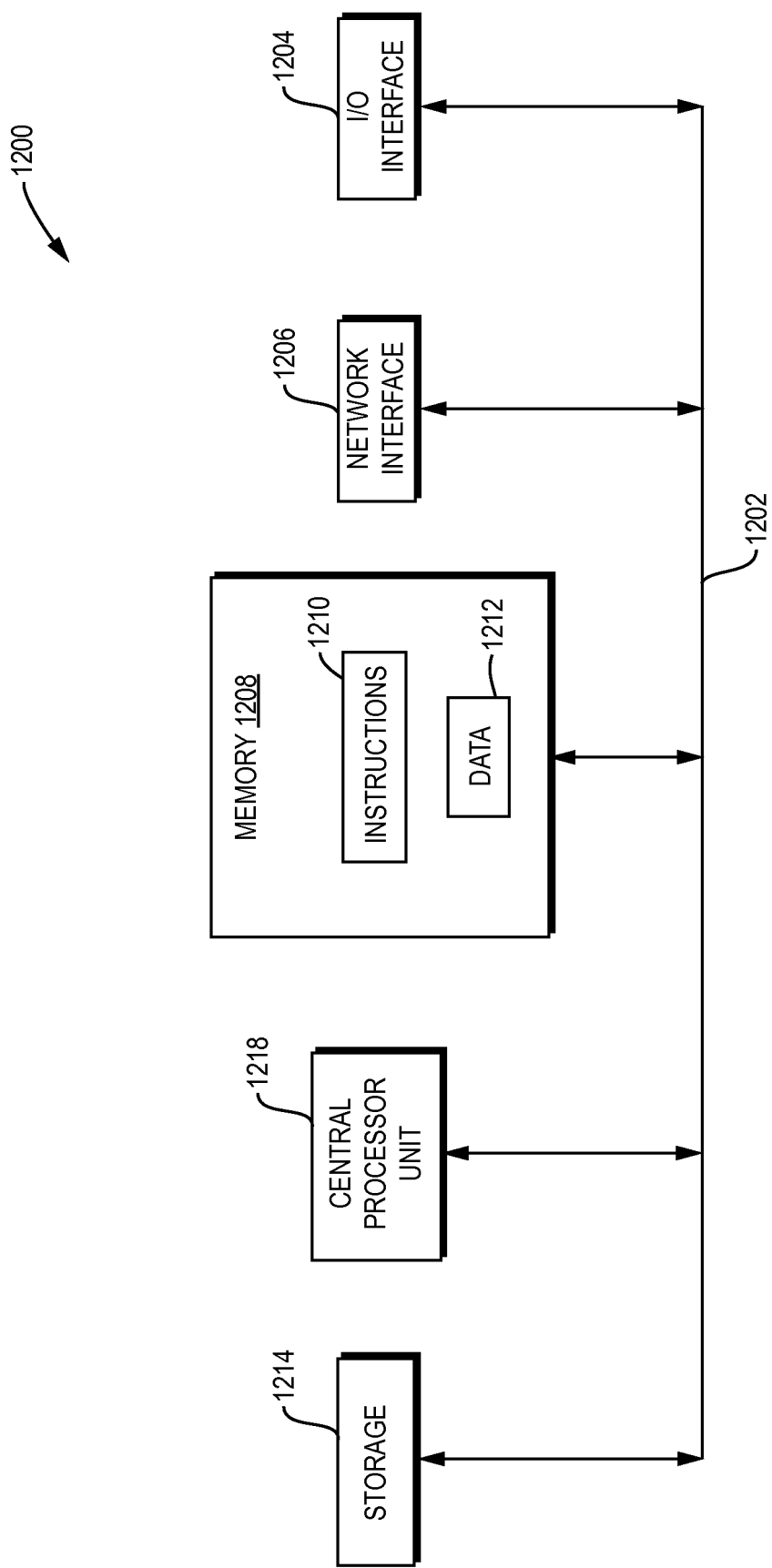
FIG. 12 is a block diagram of an example internal structure of a computer optionally within an embodiment disclosed herein.

FIG. 12 is a block diagram of an example of the internal structure of a computer 1200 in which various embodiments of the present invention may be implemented. The computer 1200 contains a system bus 1202, where a bus is a set of hardware lines used for data transfer among the components of a computer or processing system. The system bus 1202 is essentially a shared conduit that connects different elements of a computer system (e.g., processor, disk storage, memory, input/output ports, network ports, etc.) that enables the transfer of information between the elements. Operative with the system bus 1202 is an I/O device interface 1204 for connecting various input and output devices (e.g., keyboard, mouse, displays, printers, speakers, etc.) to the computer 1200. A network interface 1206 allows the computer 1200 to connect to various other devices attached to a network. Memory 1208 provides volatile storage for computer software instructions 1210 and data 1212 that may be used to implement embodiments of the present invention. Disk storage 1214 provides non-volatile storage for computer software instructions 1210 and data 1212 that may be used to implement embodiments of the present invention. A central processor unit 1218 is also operative with the system bus 1202 and provides for the execution of computer instructions.

Further example embodiments of the present invention may be configured using a computer program product; for example, controls may be programmed in software for implementing example embodiments of the present invention. Further example embodiments of the present invention may include a non-transitory computer-readable medium containing instructions that may be executed by a processor, and, when executed, cause the processor to complete methods described herein. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware.

It should be understood that the term "herein" is transferable to an application or patent incorporating the teachings presented herein such that the subject matter, definitions, or data carries forward into the application or patent making the incorporation.

If implemented in software, the software may be written in any language that can support the example embodiments disclosed herein. The software may be stored in any form of computer readable medium, such as random access memory (RAM), read only memory (ROM), compact disk read-only memory (CD-ROM), and so forth. In operation, a general purpose or application-specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A security appliance operatively coupled to a network, the security appliance comprising:
    at least one memory and at least one network interface;
    at least one processor operatively coupled to the at least one memory and the at least one network interface, the at least one processor configured to:
        select a subpattern from each pattern in a set of one or more regular expression patterns based on at least one heuristic;
        generate a unified deterministic finite automata (DFA) using the subpatterns selected from all patterns in the set;
        generate at least one non-deterministic finite automata (NFA) for at least one pattern in the set, a portion of the at least one pattern used for generating the at least one NFA, and at least one walk direction selected from a reverse and forward walk direction for run time processing of the at least one NFA, being determined based on whether a length of the subpattern selected from the at least one pattern is fixed or variable and a location of the subpattern selected within the at least one pattern; and store the unified DFA and the at least one NFA generated in the at least one memory for run time processing by the at least one processor with a payload received via the at least one network interface, to determine pattern matches in the payload prior to forwarding the payload, the subpatterns selected based on the at least one heuristic to minimize a number of false positives identified in the at least one NFA to reduce the run time processing of the at least one processor.

2. The security appliance of claim 1, wherein the at least one heuristic includes maximizing a number of unique subpatterns selected and length of each subpattern selected.

3. The security appliance of claim 1, wherein the processor is further configured to determine whether the length of the subpattern selected from the at least one pattern is fixed or variable.

4. The security appliance of claim 1, wherein the at least one processor is further configured to:
compute a hash value of each subpattern selected; and
store each hash value computed in association with an identifier of a pattern from which the subpattern was selected.

5. The security appliance of claim 1, wherein the at least one heuristic includes maximizing a number of unique subpatterns selected, and to maximize the number of unique subpatterns selected, the at least one processor is further configured to, for each pattern in the set:
compute a hash value of the subpattern selected;
compare the hash value computed to a list of hash values of subpatterns selected for other patterns in the set; and
if the hash value computed is found in the list, determine whether to replace (i) the subpattern selected with another subpattern from the pattern or (ii) the subpattern selected for another pattern in the set with an alternate subpattern selected from the other pattern in the set, the other pattern in the set being identified based on an association with the hash value computed in the list, wherein the determination for whether to replace (i) or (ii) is based on comparing lengths of subpatterns being considered for the replacement in order to maximize lengths of the unique subpatterns being selected.

6. The security appliance of claim 1, wherein the at least one heuristic includes identifying subpatterns of each pattern and disregarding a given subpattern of the subpatterns identified of each pattern, if the given subpattern has a length less than a minimum threshold.

7. The security appliance of claim 1, wherein the at least one heuristic includes accessing a knowledge base of subpatterns associated with historical frequency of use indicators and disregarding a given subpattern of the subpatterns identified of each pattern, if a historical frequency of use indicator for the given subpattern in the knowledge base accessed is greater than or equal to a frequency use threshold.

8. The security appliance of claim 1, wherein the at least one heuristic includes identifying subpatterns of each pattern, and for each pattern, maximizing a number of consecutive text characters in the subpattern selected by selecting a given subpattern of the subpatterns identified based on the given subpattern having a largest number of consecutive text characters of the subpatterns identified and based on the given subpattern being unique among all subpatterns selected for the set of one or more regular expressions.

9. The security appliance of claim 1, wherein the at least one heuristic includes:
prioritizing given subpatterns of each pattern based on a subpattern type of each of the given subpatterns and lengths of the given subpatterns, a longer length subpattern being prioritized higher than another subpattern of lesser length;
selecting a unique subpattern as the subpattern selected, based on the prioritizing, the unique subpattern selected having a length of at least a minimum length threshold; and
selecting a non-unique subpattern as the subpattern selected, based on the prioritizing, if none of the given subpatterns are unique and have a length of at least the minimum length threshold.

10. The security appliance of claim 1, wherein the at least one heuristic includes prioritizing given subpatterns of each pattern based on a subpattern type of each of the given subpatterns, the subpattern type being text only, alternation, single character repetition, or multi-character repetition, and a priority order from highest to lowest for the subpattern type is: text only, alternation, single character repetition, multi-character repetition.

11. The security appliance of claim 1, wherein if a first element of the subpattern selected is a first element of the at least one pattern and the length of the subpattern selected is fixed, the location of the subpattern selected is a beginning-location of the at least one pattern, the portion of the at least one pattern used for generating the at least one NFA is the at least one pattern excluding the subpattern selected, the at least one NFA is a single NFA, and the at least one walk direction of the at least one NFA is a forward walk direction.

12. The security appliance of claim 11, wherein to generate the unified DFA, the at least one processor is further configured to:
associate a DFA node, of the unified DFA generated, that is associated with the last element of the subpattern selected, with metadata indicating to the walker a pointer to a starting node of the at least one NFA generated, an instruction to transition to walk the at least one NFA in a forward walk direction, the starting node of the at least one NFA associated with a first element of the portion of the at least one pattern used for generating the at least one NFA, a payload starting offset of the at least one NFA being associated with a byte subsequent to another byte at the end offset of the subpattern selected, and to report a match of the subpattern selected, a lead offset within the payload, of a lead character matching the last element of the subpattern selected at the DFA node, as an end offset of the subpattern selected, and a length of the subpattern selected.

13. The security appliance of claim 11, wherein to generate the at least one NFA, the at least one processor is further configured to:
associate an NFA node, of the at least one NFA generated, with metadata indicating to the walker an instruction to terminate the walk, the NFA node associated with a last element of the at least one pattern, and to report a lag offset within the payload, of a lag character matching at the NFA node, as an end offset of the at least one pattern and a final match of the at least one pattern.

14. The security appliance of claim 1, wherein if a first element of the subpattern selected is not a first element of the at least one pattern and a last element of the subpattern selected is not a last element of the at least one pattern, the location of the subpattern selected is a mid-location of the at least one pattern, and if the length of the subpattern selected is fixed:
the portion of the at least one pattern for generating the at least one NFA includes a lag portion and a lead portion of the at least one pattern, the lag portion of the at least one pattern is the at least one pattern excluding the subpattern selected and the lead portion of the at least one pattern, the lead portion of the at least one pattern excludes the subpattern selected and the lag portion of the at least one pattern; and the at least one NFA includes a lag NFA and a lead NFA, the at least one walk direction includes a forward walk direction and a reverse walk direction, the lag NFA having the forward walk direction, the lead NFA having the reverse walk direction, the lag portion of the at least one pattern used for generating the lag NFA and the lead portion of the at least one pattern used for generating the lead NFA.

15. The security appliance of claim 14, wherein to generate the unified DFA, the at least one processor is further configured to:

associate a DFA node of the unified DFA generated, the DFA node associated with the last element of the subpattern selected, with metadata indicating to the walker a pointer to a starting node of the lag NFA, an instruction to transition to walk the lag NFA in the forward walk direction, the starting node of the lag NFA associated with a first element of the lag portion, a payload starting offset of the lag NFA associated with a byte subsequent to another byte at the end offset of the subpattern selected, a pointer to a starting node of the lead NFA, an instruction to transition to walk the lead NFA in the reverse walk direction, the starting node of the lead NFA associated with a last element of the lead portion, a payload starting offset of the lead NFA determined by subtracting the length of subpattern selected from the end offset of the subpattern selected, and to report an offset within the payload, of a character matching the last element of the subpattern selected at the DFA node, as an end offset of the subpattern selected, a match of the subpattern selected, and a length of the subpattern selected.

16. The security appliance of claim 14, wherein to generate the at least one NFA, the at least one processor is further configured to:

associate a lag node of the lag NFA, the lag node associated with the last element of the at least one pattern, with metadata indicating to the walker an instruction to terminate walking the lag NFA generated, and to report a lag offset within the payload, of a lag character of the payload matching the last element at the lag node, and a match of the lag portion of the at least one pattern; and associate a lead node of the lead NFA, the lead node associated with the first element of the at least one pattern, with metadata indicating to the walker, an instruction to terminate walking the lead NFA generated and to report a match of the lead portion of the at least one pattern and a lead offset within the payload, of a lead character of the payload matching the first element at the lead node, as a start offset of the at least one pattern, if required by a qualifier associated with the at least one pattern.

17. The security appliance of claim 1, wherein if a first element of the subpattern selected is not a first element of the at least one pattern, and a last element of the subpattern selected is not a last element of the at least one pattern, the location of the subpattern selected is a mid-location of the at least one pattern, and if the first element of the subpattern selected is the first element of the at least one pattern, the location of the subpattern selected is the beginning-location of the at least one pattern, and if the length of the subpattern selected from the at least one pattern is fixed or variable:

the portion of the at least one pattern for generating the at least one NFA includes a lag portion and an entire portion of the at least one pattern, the lag portion of the at least one pattern is the at least one pattern excluding a lead portion of the at least one pattern, the lead portion including the first element of the at least one pattern, the last element of the subpattern selected, and all elements in the at least one pattern therebetween, the entire portion of the at least one pattern is the at least one pattern, the lead portion being the subpattern selected if the location of the subpattern selected is a beginning-location; and the at least one NFA includes a lag NFA and an umbrella NFA, the at least one walk direction includes a forward walk direction and a reverse walk direction, the lag NFA having the forward walk direction, the umbrella NFA having the reverse walk direction, the lag portion of the at least one pattern used for generating the lag NFA and the entire portion of the at least one pattern used for generating the umbrella NFA.

18. The security appliance of claim 17, wherein to generate the unified DFA, the at least one processor is further configured to:

associate a DFA node of the unified DFA generated, the DFA node associated with the last element of the subpattern selected, with metadata indicating to the walker a pointer to a starting node of the lag NFA, an instruction to transition to walk the lag NFA in the forward walk direction, the starting node of the lag NFA associated with a first element of the lag portion, and to report a match of the subpattern selected and an offset within the payload, of a character matching the last element of the subpattern selected at the DFA node, as an end offset of the subpattern selected, and a length of the subpattern selected if the length is fixed.

19. The security appliance of claim 17, wherein to generate the at least one NFA, the at least one processor is further configured to:

associate a lag node of the lag NFA generated, the lag node associated with the last element of the at least one pattern, with metadata indicating to the walker a pointer to a starting node of the umbrella NFA, an instruction to transition to walk the umbrella NFA in the reverse walk direction, the starting node of the umbrella NFA associated with the last element of the at least one pattern, and to optionally report an offset within the payload, of a character matching the last element of the at least one pattern at the lag node, and to optionally report a match of the lag portion of the at least one pattern; and associate an umbrella node of the umbrella NFA generated, the umbrella node associated with the first element of the at least one pattern, with metadata indicating to the walker, an instruction to terminate the walk and to report a final match of the at least one pattern and a start offset within the payload, of a start character matching the first element of the at least one pattern at the umbrella node, as a start offset of the at least one pattern, if required by a qualifier associated with the at least one pattern.

20. The security appliance of claim 1, wherein if a first element of the subpattern selected is not a first element of the at least one pattern, and a last element of the subpattern selected is not a last element of the at least one pattern, the location of the subpattern selected is a mid-location of the at least one pattern, and if the first element of the subpattern selected is the first element of the at least one pattern, the location of the subpattern selected is a beginning-location of the at least one pattern, and if the length of the subpattern selected from the at least one pattern is fixed or variable:

the portion of the at least one pattern for generating the at least one NFA includes a lag portion and a lead portion of the at least one pattern, the lag portion of the at least one pattern is the at least one pattern excluding the lead portion of the at least one pattern, the lead portion including the first element of the at least one pattern, the last element of the subpattern selected, and all elements in the at least one pattern therebetween, the lag portion being the subpattern selected if the location of the subpattern selected is the beginning-location; and the at least one NFA includes a lag NFA and a lead NFA, the at least one walk direction includes a forward walk direction and a reverse walk direction, the lag NFA having the forward walk direction, the lead NFA having the reverse walk direction, the lag portion of the at least one pattern used for generating the lag NFA and the lead portion of the at least one pattern used for generating the lead NFA.

21. The security appliance of claim 20, wherein to generate the unified DFA, the at least one processor is further configured to:

associate a DFA node of the unified DFA generated, the DFA node associated with the last element of the subpattern selected, with metadata indicating to the walker a pointer to a starting node of the lag NFA, an instruction to transition to walk the lag NFA in the forward walk direction, the starting node of the lag NFA associated with a first element of the lag portion, a pointer to a starting node of the lead NFA, an instruction to transition to walk the lead NFA in the reverse walk direction, the starting node of the lead NFA associated with a last element of the subpattern selected, and to report a match of the subpattern selected and an offset within the payload, of a character matching the last element of the subpattern selected at the DFA node, as an end offset of the subpattern selected, and a length of the subpattern selected if the length is fixed.

22. The security appliance of claim 20, wherein to generate the at least one NFA, the at least one processor is further configured to:

associate a lag node of the lag NFA generated, the lag node associated with the last element of the at least one pattern, with metadata indicating to the walker an instruction to terminate walking the lag NFA, and to report a lag offset within the payload, of a lag character matching the last element of the at least one pattern at the lag node, and to report a match of the lag portion of the at least one pattern; and associate a lead node of the lead NFA generated, the lead node associated with the first element of the at least one pattern, with metadata indicating to the walker, an instruction to terminate walking the lead NFA and to report a match of the lead portion and a lead offset within the payload, of a lead character matching the first element of the at least one pattern at the lead node.

23. The security appliance of claim 1, wherein if a first element of the subpattern selected is not a first element of the at least one pattern, and a last element of the subpattern selected is not a last element of the at least one pattern, the location of the subpattern selected is a mid-location of the at least one pattern, and if the length of the subpattern selected from the at least one pattern is fixed or variable:

the at least one NFA is a single NFA, and the at least one walk direction includes a forward walk direction, for run time processing nodes of the single NFA associated with elements of a lag portion of the at least one pattern, and a reverse walk direction, for run time processing nodes of the single NFA associated with all elements of the at least one pattern, the lag portion of the at least one pattern being the at least one pattern excluding a lead portion of the at least one pattern, the lead portion including the first element of the at least one pattern, the last element of the subpattern selected, and all elements in the at least one pattern therebetween.

24. The security appliance of claim 23, wherein to generate the unified DFA, the at least one processor is further configured to:

associate a DFA node of the unified DFA generated, the node associated with the last element of the subpattern selected, with metadata indicating to the walker a pointer to a starting node of the single NFA, an instruction to transition to walk the single NFA generated in the forward walk direction, the starting node associated with a next element in the at least one pattern immediately following the last element of the subpattern selected, and to report a match of the subpattern selected, an offset within the payload, of a character matching the last element of the subpattern selected at the DFA node, as an end offset of the subpattern selected, and a length of the subpattern selected if the length is fixed.

25. The security appliance of claim 23, wherein to generate the at least one NFA, the at least one processor is further configured to:

associate a lag node of the single NFA, the lag node associated with a last element of the at least one pattern, with metadata indicating to the walker an instruction to transition to walk the single NFA in the reverse walk direction with a payload starting offset associated with the end offset of the subpattern selected; and associate a lead node of the single NFA, the lead node associated with the first element of the at least one pattern, with metadata indicating to the walker, an instruction to terminate the walk, and to report an offset within the payload, of a character matching the first element of the at least one pattern at the lead node, as a start offset of the at least one pattern, if required by a qualifier associated with the at least one pattern, and a final match of the at least one pattern.

26. The security appliance of claim 1, wherein if a first element of the subpattern selected is not a first element of the at least one pattern, and a last element of the subpattern selected is not a last element of the at least one pattern, the location of the subpattern selected is a mid-location of the at least one pattern, and if the length of the subpattern selected is fixed:

the at least one NFA is a single NFA, and the at least one walk direction includes a reverse walk direction, for run time processing nodes of the single NFA associated with a lead portion of the at least one pattern, and a forward walk direction, for run time processing nodes of the single NFA associated with all elements of the at least one pattern, the lead portion being the at least one pattern excluding a lag portion of the at least one pattern, the lag portion including the first element of the subpattern selected, the last element of the at least one pattern, and all elements in the at least one pattern therebetween.

27. The security appliance of claim 26, wherein to generate the unified DFA, the at least one processor is further configured to:

associate a DFA node of the unified DFA generated, the node associated with the last element of the subpattern selected, with metadata indicating to the walker a pointer to a starting node of the single NFA, an instruction to transition to walk the single NFA generated in the reverse walk direction, the starting node associated with a last element of the lead portion, a payload starting offset being determined by subtracting the length of subpattern selected from the end offset of the subpattern selected, and to report a match of the subpattern selected, an offset within the payload, of a character matching the last element of the subpattern selected at the DFA node, as an end offset of the subpattern selected, and a length of the subpattern selected.

28. The security appliance of claim 26, wherein to generate the at least one NFA, the at least one processor is further configured to:
associate a lead node of the single NFA, the lead node associated with a first element of the at least one pattern, with metadata indicating to the walker an instruction to transition to walk the single NFA in the forward walk direction; and
associate a lag node of the single NFA, the lag node associated with the last element of the at least one pattern, with metadata indicating to the walker, an instruction to terminate the walk, and to report an offset within the payload, of a character matching the last element of the at least one pattern at the lag node, and a final match of the at least one pattern.

29. The security appliance of claim 1, wherein if a last element of the subpattern selected is a last element of the at least one pattern, the location of the subpattern selected is an end-location of the at least one pattern, and if the length of the subpattern selected is fixed, the portion of the at least one pattern for generating the at least one NFA is the at least one pattern excluding the subpattern selected, and the at least one walk direction is a reverse walk direction.

30. The security appliance of claim 29, wherein to generate the unified DFA the processor is further configured to:
associate a DFA node, the DFA node corresponding to the last element of the subpattern selected, with metadata indicating to the walker a pointer to a starting node of the at least one NFA generated, an instruction to transition to walk the at least one NFA generated in a reverse walk direction, the starting node of the at least one NFA generated associated with a last element of the portion, a payload starting offset of the at least one NFA generated being determined by subtracting the length of subpattern selected from the end offset of the subpattern selected, and to report a match of the subpattern selected and an offset within the payload, of a character matching the last element of the subpattern selected at the DFA node, as an end offset of the subpattern selected.

31. The security appliance of claim 29, wherein to generate the at least one NFA the processor is further configured to:
associate an NFA node associated with a first element of the portion, with metadata indicating to the walker to terminate the walk and to report a final match of the at least one pattern and an offset within the payload, of a character matching the first element of the portion at the NFA node, as a start offset of the at least one pattern, if required by a qualifier associated with the at least one pattern.

32. The security appliance of claim 1, wherein if a last element of the subpattern selected is a last element of the at least one pattern, the location of the subpattern selected is an end-location of the at least one pattern, and if the length of the subpattern selected from the at least one pattern is variable or fixed, the portion of the at least one pattern for generating the at least one NFA is the at least one pattern, and the at least one walk direction is a reverse walk direction.

33. The security appliance of claim 32, wherein to generate the unified DFA the processor is further configured to:
associate a DFA node, the DFA node corresponding to the last element of the subpattern selected, with metadata indicating to the walker a pointer to a starting node of the at least one NFA generated, an instruction to transition to walk the at least one NFA generated in a reverse walk direction, the starting node of the at least one NFA generated associated with a last element of the subpattern selected, a payload starting offset of the at least one NFA generated associated with the end offset of the subpattern selected, and to report a match of the subpattern selected and an offset within the payload, of a character matching the last element of the subpattern selected at the DFA node, as an end offset of the subpattern selected, and a length of the subpattern selected if the length is fixed.

34. The security appliance of claim 32, wherein to generate the at least one NFA the processor is further configured to:
associate an NFA node associated with a first element of the portion, with metadata indicating to the walker to terminate the walk and to report a final match of the at least one pattern and an offset within the payload, of a character matching the first element of the portion at the NFA node, as a start offset of the at least one pattern, if required by a qualifier associated with the at least one pattern.

35. The security appliance of claim 1, wherein to store the unified DFA and the at least one NFA generated in the at least one memory the processor is further configured to generate a binary image including the unified DFA and the at least one NFA generated.

36. The security appliance of claim 1, wherein the at least one processor includes a DFA co-processor and an NFA co-processor configured as an acceleration unit to offload DFA and NFA run time processing, respectively.

37. A method comprising:
in at least one processor operatively coupled to at least one memory and at least one network interface in a security appliance operatively coupled to a network:
selecting a subpattern from each pattern in a set of one or more regular expression patterns based on at least one heuristic;
generating a unified deterministic finite automata (DFA) using the subpatterns selected from all patterns in the set;
generating at least one non-deterministic finite automata (NFA) for at least one pattern in the set, a portion of the at least one pattern used for generating the at least one NFA, and at least one walk direction selected from a reverse and forward walk direction for run time processing of the at least one NFA, being determined based on whether a length of the subpattern selected from the at least one pattern is fixed or variable and a location of the subpattern selected within the at least one pattern; and
storing the unified DFA and the at least one NFA generated in the at least one memory for run time processing by the at least one processor with a payload received via the at least one network interface, to determine pattern matches in the payload prior to forwarding the payload, the subpatterns selected based on the at least one heuristic to minimize a number of false positives identified in the at least one NFA to reduce the run time processing of the at least one processor.

38. The method of claim 37, wherein the at least one heuristic includes maximizing a number of unique subpatterns selected and length of each subpattern selected.

39. The method of claim 37, further including determining whether the length of the subpattern selected from the at least one pattern is fixed or variable.

40. The method of claim 37, further including:
computing a hash value of each subpattern selected; and
storing each hash value computed in association with an identifier of a pattern from which the subpattern was selected.

41. The method of claim 37, wherein the at least one heuristic includes maximizing a number of unique subpatterns selected, and further including, for each pattern in the set:
computing a hash value of the subpattern selected;
comparing the hash value computed to a list of hash values of subpatterns selected for other patterns in the set; and
if the hash value computed is found in the list, determining whether to replace (i) the subpattern selected with another subpattern from the pattern or (ii) the subpattern selected for another pattern in the set with an alternate subpattern selected from the other pattern in the set, the other pattern in the set being identified based on an association with the hash value computed in the list, wherein the determination for whether to replace (i) or (ii) is based on comparing lengths of subpatterns being considered for the replacement in order to maximize lengths of the unique subpatterns being selected.

42. The method of claim 37, wherein the at least one heuristic includes identifying subpatterns of each pattern and disregarding a given subpattern of the subpatterns identified of each pattern, if the given subpattern has a length less than a minimum threshold.

43. The method of claim 37, wherein the at least one heuristic includes accessing a knowledge base of subpatterns associated with historical frequency of use indicators and disregarding a given subpattern of the subpatterns identified of each pattern, if a historical frequency of use indicator for the given subpattern in the knowledge base accessed is greater than or equal to a frequency use threshold.

44. The method of claim 37, wherein the at least one heuristic includes identifying subpatterns of each pattern, and for each pattern, maximizing a number of consecutive text characters in the subpattern selected by selecting a given subpattern of the subpatterns identified based on the given subpattern having a largest number of consecutive text characters of the subpatterns identified and based on the given subpattern being unique among all subpatterns selected for the set of one or more regular expressions.

45. The method of claim 37, wherein the at least one heuristic includes:
prioritizing given subpatterns of each pattern based on a subpattern type of each of the given subpatterns and lengths of the given subpatterns, a longer length subpattern being prioritized higher than another subpattern of lesser length;
selecting a unique subpattern as the subpattern selected, based on the prioritizing, the unique subpattern selected having a length of at least a minimum length threshold; and
selecting a non-unique subpattern as the subpattern selected, based on the prioritizing, if none of the given subpatterns are unique and have a length of at least the minimum length threshold.

46. The method of claim 37, wherein the at least one heuristic includes prioritizing given subpatterns of each pattern based on a subpattern type of each of the given subpatterns, the subpattern type being text only, alternation, single character repetition, or multi-character repetition, and a priority order from highest to lowest for the subpattern type is: text only, alternation, single character repetition, multi-character repetition.

47. The method of claim 37, wherein if a first element of the subpattern selected is a first element of the at least one pattern and the length of the subpattern selected is fixed, the location of the subpattern selected is a beginning-location of the at least one pattern, the portion of the at least one pattern used for generating the at least one NFA is the at least one pattern excluding the subpattern selected, the at least one NFA is a single NFA, and the at least one walk direction of the at least one NFA is a forward walk direction.

48. The method of claim 47, wherein generating the unified DFA includes:
associating a DFA node, of the unified DFA generated, that is associated with the last element of the subpattern selected, with metadata indicating to the walker a pointer to a starting node of the at least one NFA generated, an instruction to transition to walk the at least one NFA in a forward walk direction, the starting node of the at least one NFA associated with a first element of the portion of the at least one pattern used for generating the at least one NFA, a payload starting offset of the at least one NFA associated with a byte subsequent to another byte at the end offset of the subpattern selected, and to report a match of the subpattern selected, a lead offset within the payload, of a lead character matching the last element of the subpattern selected at the DFA node, as an end offset of the subpattern selected, and a length of the subpattern selected.

49. The method of claim 47, wherein generating the at least one NFA includes:
associating an NFA node, of the at least one NFA generated, with metadata indicating to the walker an instruction to terminate the walk, the NFA node associated with a last element of the at least one pattern, and to report a lag offset within the payload, of a lag character matching at the NFA node, as an end offset of the at least one pattern and a final match of the at least one pattern.

50. The method of claim 37, wherein if a first element of the subpattern selected is not a first element of the at least one pattern and a last element of the subpattern selected is not a last element of the at least one pattern, the location of the subpattern selected is a mid-location of the at least one pattern, and if the length of the subpattern selected is fixed:
the portion of the at least one pattern for generating the at least one NFA includes a lag portion and a lead portion of the at least one pattern, the lag portion of the at least one pattern is the at least one pattern excluding the subpattern selected and the lead portion of the at least one pattern, the lead portion of the at least one pattern excludes the subpattern selected and the lag portion of the at least one pattern; and
the at least one NFA includes a lag NFA and a lead NFA, the at least one walk direction includes a forward walk direction and a reverse walk direction, the lag NFA having the forward walk direction, the lead NFA having the reverse walk direction, the lag portion of the at least one pattern used for generating the lag NFA and the lead portion of the at least one pattern used for generating the lead NFA.

51. The method of claim 50, generate the unified DFA includes:
associating a DFA node of the unified DFA generated, the DFA node associated with the last element of the subpattern selected, with metadata indicating to the walker a pointer to a starting node of the lag NFA, an instruction to transition to walk the lag NFA in the forward walk direction, the starting node of the lag NFA associated with a first element of the lag portion, a payload starting offset of the lag NFA associated with byte subsequent to the end offset of the subpattern selected, a pointer to a starting node of the lead NFA, an instruction to transition to walk the lead NFA in the reverse walk direction, the starting node of the lead NFA associated with a last element of the lead portion, a payload starting offset of the lead NFA determined by subtracting the length of subpattern selected from the end offset of the subpattern selected, and to report an offset within the payload, of a character matching the last element of the subpattern selected at the DFA node, as an end offset of the subpattern selected, a match of the subpattern selected, and a length of the subpattern selected.

52. The method of claim 50, wherein generating the at least one NFA includes:
associating a lag node of the lag NFA, the lag node associated with the last element of the at least one pattern, with metadata indicating to the walker an instruction to terminate walking the lag NFA generated, and to report a lag offset within the payload, of a lag character of the payload matching the last element at the lag node, and a match of the lag portion of the at least one pattern; and
associating a lead node of the lead NFA, the lead node associated with the first element of the at least one pattern, with metadata indicating to the walker, an instruction to terminate walking the lead NFA generated and to report a match of the lead portion of the at least one pattern and a lead offset within the payload, of a lead character of the payload matching the first element at the lead node, as a start offset of the at least one pattern, if required by a qualifier associated with the at least one pattern.

53. The method of claim 37, wherein if a first element of the subpattern selected is not a first element of the at least one pattern, and a last element of the subpattern selected is not a last element of the at least one pattern, the location of the subpattern selected is a mid-location of the at least one pattern, and if the first element of the subpattern selected is the first element of the at least one pattern, the location of the subpattern selected is the beginning-location of the at least one pattern, and if the length of the subpattern selected from the at least one pattern is fixed or variable:
the portion of the at least one pattern for generating the at least one NFA includes a lag portion and an entire portion of the at least one pattern, the lag portion of the at least one pattern is the at least one pattern excluding a lead portion of the at least one pattern, the lead portion including the first element of the at least one pattern, the last element of the subpattern selected, and all elements in the at least one pattern therebetween, the entire portion of the at least one pattern is the at least one pattern, the lead portion being the subpattern selected if the location of the subpattern selected is a beginning-location; and the at least one NFA includes a lag NFA and an umbrella NFA, the at least one walk direction includes a forward walk direction and a reverse walk direction, the lag NFA having the forward walk direction, the umbrella NFA having the reverse walk direction, the lag portion of the at least one pattern used for generating the lag NFA and the entire portion of the at least one pattern used for generating the umbrella NFA.

54. The method of claim 53, wherein generating the unified DFA includes:
associating a DFA node of the unified DFA generated, the DFA node associated with the last element of the subpattern selected, with metadata indicating to the walker a pointer to a starting node of the lag NFA, an instruction to transition to walk the lag NFA in the forward walk direction, the starting node of the lag NFA associated with a first element of the lag portion, and to report a match of the subpattern selected and an offset within the payload, of a character matching the last element of the subpattern selected at the DFA node, as an end offset of the subpattern selected, and a length of the subpattern selected if the length is fixed.

55. The method of claim 53, wherein generating the at least one NFA includes:
associating a lag node of the lag NFA generated, the lag node associated with the last element of the at least one pattern, with metadata indicating to the walker a pointer to a starting node of the umbrella NFA, an instruction to transition to walk the umbrella NFA in the reverse walk direction, the starting node of the umbrella NFA associated with the last element of the at least one pattern, and to optionally report an offset within the payload, of a character matching the last element of the at least one pattern at the lag node, and to optionally report a match of the lag portion of the at least one pattern; and
associating an umbrella node of the umbrella NFA generated, the umbrella node associated with the first element of the at least one pattern, with metadata indicating to the walker, an instruction to terminate the walk and to report a final match of the at least one pattern and a start offset within the payload, of a start character matching the first element of the at least one pattern at the umbrella node, as a start offset of the at least one pattern, if required by a qualifier associated with the at least one pattern.

56. The method of claim 37, wherein if a first element of the subpattern selected is not a first element of the at least one pattern, and a last element of the subpattern selected is not a last element of the at least one pattern, the location of the subpattern selected is a mid-location of the at least one pattern, and if the first element of the subpattern selected is the first element of the at least one pattern, the location of the subpattern selected is a beginning-location of the at least one pattern, and if the length of the subpattern selected from the at least one pattern is fixed or variable:
the portion of the at least one pattern for generating the at least one NFA includes a lag portion and a lead portion of the at least one pattern, the lag portion of the at least one pattern is the at least one pattern excluding the lead portion of the at least one pattern, the lead portion including the first element of the at least one pattern, the last element of the subpattern selected, and all elements in the at least one pattern therebetween, the lag portion being the subpattern selected if the location of the subpattern selected is the beginning-location; and
the at least one NFA includes a lag NFA and a lead NFA, the at least one walk direction includes a forward walk direction and a reverse walk direction, the lag NFA having the forward walk direction, the lead NFA having the reverse walk direction, the lag portion of the at least one pattern used for generating the lag NFA and the lead portion of the at least one pattern used for generating the lead NFA.

57. The method of claim 56, wherein generating the unified DFA includes:
associating a DFA node of the unified DFA generated, the DFA node associated with the last element of the subpattern selected, with metadata indicating to the walker a pointer to a starting node of the lag NFA, an instruction to transition to walk the lag NFA in the forward walk direction, the starting node of the lag NFA associated with a first element of the lag portion, a pointer to a starting node of the lead NFA, an instruction to transition to walk the lead NFA in the reverse walk direction, the starting node of the lead NFA associated with a last element of the subpattern selected, and to report a match of the subpattern selected and an offset within the payload, of a character matching the last element of the subpattern selected at the DFA node, as an end offset of the subpattern selected, and a length of the subpattern selected if the length is fixed.

58. The method of claim 56, wherein to generating the at least one NFA includes:
associating a lag node of the lag NFA generated, the lag node associated with the last element of the at least one pattern, with metadata indicating to the walker an instruction to terminate walking the lag NFA, and to report a lag offset within the payload, of a lag character matching the last element of the at least one pattern at the lag node, and to report a match of the lag portion of the at least one pattern; and
associating a lead node of the lead NFA generated, the lead node associated with the first element of the at least one pattern, with metadata indicating to the walker, an instruction to terminate walking the lead NFA and to report a match of the lead portion and a lead offset within the payload, of a lead character matching the first element of the at least one pattern at the lead node.

59. The method of claim 37, wherein if a first element of the subpattern selected is not a first element of the at least one pattern, and a last element of the subpattern selected is not a last element of the at least one pattern, the location of the subpattern selected is a mid-location of the at least one pattern, and if the length of the subpattern selected from the at least one pattern is fixed or variable:
the at least one NFA is a single NFA, and the at least one walk direction includes a forward walk direction, for run time processing nodes of the single NFA associated with elements of a lag portion of the at least one pattern, and a reverse walk direction, for run time processing nodes of the single NFA associated with all elements of the at least one pattern, the lag portion of the at least one pattern being the at least one pattern excluding a lead portion of the at least one pattern, the lead portion including the first element of the at least one pattern, the last element of the subpattern selected, and all elements in the at least one pattern therebetween.

60. The method of claim 59, wherein generating the unified DFA includes:
associating a DFA node of the unified DFA generated, the node associated with the last element of the subpattern selected, with metadata indicating to the walker a pointer to a starting node of the single NFA, an instruction to transition to walk the single NFA generated in the forward walk direction, the starting node associated with a next element in the at least one pattern immediately following the last element of the subpattern selected, and to report a match of the subpattern selected, an offset within the payload, of a character matching the last element of the subpattern selected at the DFA node, as an end offset of the subpattern selected, and a length of the subpattern selected if the length is fixed.

61. The method of claim 59, wherein generating the at least one NFA includes:
associating a lag node of the single NFA, the lag node associated with a last element of the at least one pattern, with metadata indicating to the walker an instruction to transition to walk the single NFA in the reverse walk direction with a payload starting offset associated with the end offset of the subpattern selected; and
associating a lead node of the single NFA, the lead node associated with the first element of the at least one pattern, with metadata indicating to the walker, an instruction to terminate the walk, and to report an offset within the payload, of a character matching the first element of the at least one pattern at the lead node, as a start offset of the at least one pattern, if required by a qualifier associated with the at least one pattern, and a final match of the at least one pattern.

62. The method of claim 37, wherein if a first element of the subpattern selected is not a first element of the at least one pattern, and a last element of the subpattern selected is not a last element of the at least one pattern, the location of the subpattern selected is a mid-location of the at least one pattern, and if the length of the subpattern selected is fixed:
the at least one NFA is a single NFA, and the at least one walk direction includes a reverse walk direction, for run time processing nodes of the single NFA associated with a lead portion of the at least one pattern, and a forward walk direction, for run time processing nodes of the single NFA associated with all elements of the at least one pattern, the lead portion being the at least one pattern excluding a lag portion of the at least one pattern, the lag portion including the first element of the subpattern selected, the last element of the at least one pattern, and all elements in the at least one pattern therebetween.

63. The method of claim 62, wherein generating the unified DFA includes:
associating a DFA node of the unified DFA generated, the node associated with the last element of the subpattern selected, with metadata indicating to the walker a pointer to a starting node of the single NFA, an instruction to transition to walk the single NFA generated in the reverse walk direction, the starting node associated with a last element of the lead portion, a payload starting offset being determined by subtracting the length of subpattern selected from the end offset of the subpattern selected, and to report a match of the subpattern selected, an offset within the payload, of a character matching the last element of the subpattern selected at the DFA node, as an end offset of the subpattern selected, and a length of the subpattern selected.

64. The method of claim 62, wherein to generating the at least one NFA includes:
associating a lead node of the single NFA, the lead node associated with a first element of the at least one pattern, with metadata indicating to the walker an instruction to transition to walk the single NFA in the forward walk direction; and
associating a lag node of the single NFA, the lag node associated with the last element of the at least one pattern, with metadata indicating to the walker, an instruction to terminate the walk, and to report an offset within the payload, of a character matching the last element of the at least one pattern at the lag node, and a final match of the at least one pattern.

65. The method of claim 37, wherein if a last element of the subpattern selected is a last element of the at least one pattern, the location of the subpattern selected is an end-location of the at least one pattern, and if the length of the subpattern selected is fixed, the portion of the at least one pattern for generating the at least one NFA is the at least one pattern excluding the subpattern selected, and the at least one walk direction is a reverse walk direction.

66. The method of claim 65, wherein generating the unified DFA includes:
associating a DFA node, the DFA node corresponding to the last element of the subpattern selected, with metadata indicating to the walker a pointer to a starting node of the at least one NFA generated, an instruction to transition to walk the at least one NFA generated in a reverse walk direction, the starting node of the at least one NFA generated associated with a last element of the portion, and to report a match of the subpattern selected and an offset within the payload, of a character matching the last element of the subpattern selected at the DFA node, as an end offset of the subpattern selected.

67. The method of claim 65, wherein generating the at least one NFA includes:
associating an NFA node associated with a first element of the portion, with metadata indicating to the walker to terminate the walk and to report a final match of the at least one pattern and an offset within the payload, of a character matching the first element of the portion at the NFA node, as a start offset of the at least one pattern, if required by a qualifier associated with the at least one pattern.

68. The method of claim 37, wherein if a last element of the subpattern selected is a last element of the at least one pattern, the location of the subpattern selected is an end-location of the at least one pattern, and if the length of the subpattern selected from the at least one pattern is variable or fixed, the portion of the at least one pattern for generating the at least one NFA is the at least one pattern, and the at least one walk direction is a reverse walk direction.

69. The method of claim 68, wherein generating the unified DFA includes:
associating a DFA node, the DFA node corresponding to the last element of the subpattern selected, with metadata indicating to the walker a pointer to a starting node of the at least one NFA generated, an instruction to transition to walk the at least one NFA generated in a reverse walk direction, the starting node of the at least one NFA generated associated with a last element of the subpattern selected, a payload starting offset of the at least one NFA generated associated with the end offset of the subpattern selected, and to report a match of the subpattern selected and an offset within the payload, of a character matching the last element of the subpattern selected at the DFA node, as an end offset of the subpattern selected, and a length of the subpattern selected if the length is fixed.

70. The method of claim 68, wherein to generating the at least one NFA includes:
associating an NFA node associated with a first element of the portion, with metadata indicating to the walker to terminate the walk and to report a final match of the at least one pattern and an offset within the payload, of a character matching the first element of the portion at the NFA node, as a start offset of the at least one pattern, if required by a qualifier associated with the at least one pattern.

71. The method of claim 37, wherein storing the unified DFA and the at least one NFA generated in the at least one memory includes generating a binary image including the unified DFA and the at least one NFA generated.

72. The method of claim 37, wherein the at least one processor includes a DFA co-processor and an NFA co-processor configured as an acceleration unit to offload DFA and NFA run time processing, respectively.

73. A non-transitory computer-readable medium having stored thereon a sequence of instructions which, when loaded and executed by a processor operatively coupled to at least one memory and at least one network interface in a security appliance, causes the processor to:
select a subpattern from each pattern in a set of one or more regular expression patterns based on at least one heuristic;
generate a unified deterministic finite automata (DFA) using the subpatterns selected from all patterns in the set;
generate at least one non-deterministic finite automata (NFA) for at least one pattern in the set, a portion of the at least one pattern used for generating the at least one NFA, and at least one walk direction selected from a reverse and forward walk direction for run time processing of the at least one NFA, being determined based on whether a length of the subpattern selected from the at least one pattern is fixed or variable and a location of the subpattern selected within the at least one pattern; and
store the unified DFA and the at least one NFA generated in the at least one memory for run time processing by the at least one processor with a payload received via the at least one network interface, to determine pattern matches in the payload prior to forwarding the payload, the subpatterns selected based on the at least one heuristic to minimize a number of false positives identified in the at least one NFA to reduce the run time processing of the at least one processor.

* * * * *